(12) United States Patent
Menon et al.

(10) Patent No.: US 12,320,943 B2
(45) Date of Patent: Jun. 3, 2025

(54) AUGMENTED GEOLOGICAL SERVICE CHARACTERIZATION

(71) Applicant: SCHLUMBERGER TECHNOLOGY CORPORATION, Sugar Land, TX (US)

(72) Inventors: Shashi Menon, Houston, TX (US); Aria Abubakar, Sugar Land, TX (US); Vikas Jain, Sugar Land, TX (US); David Furse Allen, Katy, TX (US); John Rasmus, Richmond, TX (US); John Paul Horkowitz, Sugar Land, TX (US); Valerian Guillot, Montpellier (FR); Florent D'Halluin, Grabels (FR); Ridvan Akkurt, Denver, CO (US); Sylvain Wlodarczyk, Saint Clement de Riviere (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/061,563

(22) Filed: Dec. 5, 2022

(65) Prior Publication Data
US 2023/0105326 A1    Apr. 6, 2023

Related U.S. Application Data

(63) Continuation of application No. 16/439,624, filed on Jun. 12, 2019, now Pat. No. 11,520,075, which is a
(Continued)

(51) Int. Cl.
*G01V 11/00*    (2006.01)
*G01V 20/00*    (2024.01)
(Continued)

(52) U.S. Cl.
CPC ............ *G01V 11/002* (2013.01); *G01V 20/00* (2024.01); *G06Q 10/0633* (2013.01); *G06Q 10/103* (2013.01)

(58) Field of Classification Search
None
See application file for complete search history.

(56) References Cited

U.S. PATENT DOCUMENTS

| 4,718,011 A | 1/1988 | Patterson, Jr. |
| 9,176,252 B2 | 11/2015 | Liang et al. |

(Continued)

FOREIGN PATENT DOCUMENTS

| WO | 2010039914 A3 | 7/2010 |
| WO | 2011109839 A2 | 9/2011 |
| WO | 2018111857 A1 | 6/2018 |

OTHER PUBLICATIONS

Notice of Acceptance for Patent Application issued in Australia Patent Application No. 2017375796 dated Sep. 12, 2023, 3 pages.
(Continued)

*Primary Examiner* — Walter L Lindsay, Jr.
*Assistant Examiner* — Geoffrey T Evans
(74) *Attorney, Agent, or Firm* — Jeffrey D. Frantz

(57) ABSTRACT

Methods and systems for augmented geological service characterization are described. An embodiment of a method includes generating a geological service characterization process in response to one or more geological service objectives and a geological service experience information set. Such a method may also include augmenting the geological service characterization process by machine learning in response to a training information set. Additionally, the method may include generating an augmented geological service characterization process in response to the determination information.

8 Claims, 18 Drawing Sheets

Related U.S. Application Data continuation of application No. PCT/US2017/065789, filed on Dec. 12, 2017.

(60) Provisional application No. 62/433,229, filed on Dec. 12, 2016.

(51) Int. Cl.
  *G06Q 10/0633* (2023.01)
  *G06Q 10/10* (2023.01)

(56) References Cited

U.S. PATENT DOCUMENTS

| | | | |
|---|---|---|---|
| 9,274,249 | B2 | 3/2016 | Thorne |
| 2003/0078901 | A1 | 4/2003 | Coppola |
| 2004/0133531 | A1 | 7/2004 | Chen |
| 2013/0096898 | A1 | 4/2013 | Usadi |
| 2014/0019057 | A1 | 1/2014 | Diller |
| 2014/0379317 | A1* | 12/2014 | Sanden .................. G06T 3/40 703/10 |
| 2015/0300151 | A1 | 10/2015 | Mohaghegh |
| 2016/0178546 | A1 | 6/2016 | Jain |

OTHER PUBLICATIONS

Abubakar, et al. "Joint inversion approaches for geophysical electromagnetic and elastic full-waveform data," Inverse Problems, vol. 28, pp. 1-19, 2012.

Ijasan, et al. "Inversion-based interpretation of logging-while-drilling resistivity and nuclear measurements: Field examples of application in high-angle and horizontal wells," Petrophysics, vol. 55, No. 5, 374-391, 2014.

Jain, et al., "Maximizing Information through Data Driven Analytics in Petrophysical Evaluation of Well Logs," SPE Annual Technical Conference and Exhibition held in Houston, TX, USA, Sep. 28-30, 2015.

International Search Report and Written Opinion for the equivalent International patent Application PCT/US2017/065789 mailed on May 29, 2018.

International Preliminary Report on Patentability for the equivalent International Patent Application PCT/US2017/065789 mailed on Jun. 27, 2019.

David Volent Lindberg et al Petro-Elastic Log-Facies Classification Using the Expectation-Maximization Algorithm and Hidden Markov Models_International Association for Mathematical Geosciences 2015, 34 pages.

First Office Action for the equivalent Chinese patent application 2017800841615 mailed on Sep. 2, 2020 (English translation).

Second Office Action for the equivalent Chinese patent application 2017800841615 dated Apr. 23, 2021, 11 pages with English translation.

Communication Pursuant to Rule 164(2)(b) and Article 94(3) EPC for European Patent Application 17822945.6-1001 dated Jun. 21, 2021, 11 pages.

Exam Report issued in Canadian Patent Application No. 3,046,862 dated May 29, 2024, 5 pages.

Communication pursuant to Article 94(3) issued in European Patent Application No. 17822945.6 dated Sep. 1, 2024, 6 pages.

* cited by examiner

AUGMENTED GEOLOGICAL SERVICE CHARACTERIZATION

CROSS REFERENCE TO RELATED APPLICATIONS

This application is a continuation of U.S. patent application Ser. No. 16/439,624, which was filed on Jun. 12, 2019, which in turn claims priority to PCT Patent App. No. PCT/US2017/065789, which was filed on Dec. 12, 2017, which in turn claims priority to U.S. Provisional Patent App. No. 62/433,229, which was filed on Dec. 12, 2016. The contents of the foregoing applications are incorporated herein in their entirety.

BACKGROUND

Geological systems and services include a variety of fields related to exploration and resource production activities from subterranean and subsea regions. For example, geological services may include oil services, natural gas services, mining services for fossil fuels, metals, and minerals, as well as environmental protection, cleanup, and surveying services.

Oil services relates to a variety of services and systems associated with exploration, drilling, production, maintenance, and other activities related to identification and production of oil, natural gas, and other fossil fuel products. Such systems are often very complex, and require the assistance of highly specialized, educated, and knowledgeable experts to design system data acquisition and analysis processes.

Exploration surveys such as gravity surveys, magnetic surveys, passive seismic surveys, regional reflection surveys, towed seismic surveys, sonar array surveys, and seafloor seismic systems generate large volumes of data, and it is time and resource intensive to analyze such quantities of data. Additionally, analysis of the data is generally not very straightforward, and involves many different steps and calculations. The set of steps and calculations used to analyze one set of data may be different form the set of steps and calculations used to analyze another set of data, depending upon the type of data acquisition system used, the geography of the surveyed area, the type of exploration process used, the target material, and the like. Thus, analysis of oil exploration surveys often requires direction or insights from experts in the field.

The problem is compounded when other oil service activities are performed. For example, the acquired data, parameters, and quantities of interest to analyze or maintain an active well may be completely different from the data, parameters, and quantities of interest required for oil exploration. In some situations, the same suite of software and analytics tools may be used to accomplish both tasks. Thus, further expert guidance has been previously required to design data acquisition and analytics protocols for disparate oil service activities.

A data acquisition system may include any type of system that acquires data and provides that data for further processing. An example of a data acquisition system is a data entry terminal configured to receive data entries from a user through a user interface device. Another example of a data acquisition system is a sensor system, where one or more physical sensor devices is configured to generate a signal in response to a measurement or detected level of a physical parameter. Other data acquisition systems include digital monitoring devices, measurement devices, automated data collection devices, and the like.

A complex system may include multiple data acquisition systems or devices, including data acquisition systems of disparate types. For example, a user-based data acquisition system may receive data from multiple users, each user using a slightly different convention for entering data. In an example involving sensors, the data acquisition system may include multiple sensors, where the sensors may be made by different manufacturers. In such an example, each manufacturer may use a different convention for generating data. In still another example, a complex system may include a combination of user interface devices for receiving data from users, multiple sensors, and various additional or alternative data acquisition devices, such as measurement devices or digital monitoring devices.

In such systems, data may be acquired in multiple disparate formats. For example, some sensors or users may provide data in metric units. Other data acquisition devices or users may provide data in English system units. In various other examples, the decimal base used for data entry may be different between devices or users. In still other examples, units may be omitted for some data entries. Thus, one problem with prior acquisition systems, and particularly complex acquisition systems, is that the units associated with data entries may be inconsistent. Such inconsistencies may be problematic when the data is processed further.

A workflow may include a specified set of data to be acquired by a particular data acquisition system, a specified set of analytics tools to be used for analyzing the acquired data, a specified sequence of analysis, a specified set of calculations or operations to be performed on the acquired data, and a specified set of quantities of interest to be generated by the workflow. In prior systems, the workflow was designed and often implemented by experts, with independent and specialized knowledge used to accomplish an analysis project. The problem with expert definition of the workflow is that the knowledge employed by one expert to design a workflow may be different from the knowledge used by another expert. Therefore, results are not standardized and inconsistencies exist. Moreover, when a particular expert changes jobs or leaves a particular post, the knowledge acquired and used by that expert for designing the workflows is forgotten or lost to the company employing the expert. Various other issues and problems exist with prior use of experts for design and/or implementation of data acquisition and analysis workflows.

BRIEF SUMMARY

Methods and systems for augmented geological service characterization are described.

An embodiment of a method includes generating a geological service characterization process in response to one or more geological service objectives and a geological service experience information set. Such a method may also include augmenting the geological service characterization process by machine learning in response to a training information set. Additionally, the method may include generating an augmented geological service characterization process in response to the augmentation.

The generating the geological service characterization process may include generating a data acquisition protocol to be conducted using a data acquisition system.

The data acquisition protocol may be automatically generated by an acquisition advisor unit in response to the one or more geological service objectives and the geological service experience information set.

The generating the data acquisition protocol may include specifying a set of measurements to be taken using the data acquisition system.

The generating the geological service characterization process may include generating a data analysis process to be conducted using a data analysis system.

The generating the data analysis process may include generating a workflow to analyze a measurement received from the data acquisition system.

The workflow may include a specification of calculations to be performed in response to the measurement.

The workflow may include a specification of a sequence of operations and calculations to be performed in response to the measurement.

The workflow may be automatically generated by a workflow builder unit in response to the one or more geological service objectives and the geological service experience information set.

The generating the data analysis process may include defining a parameter for used in the data analysis process.

The parameter may be automatically generated by an interpretation unit in response to the workflow.

The method may include generating the training information set in response to information collected by the geological service characterization process and storing the training information set in a training database.

The generating the training information set may include collecting a measurement, a parameter, and a quantity of interest generated in response to the geological service characterization process.

The generating the training information set may include collecting an augmented measurement, an augmented parameter, and an enhanced quantity of interest generated in response to the augmented geological service characterization process.

The augmenting the geological service characterization process may include classifying information in the training information set.

The classifying may include performing an automated data classification process on the training information set.

The automated data classification process may include a clustering algorithm.

The classifying may include performing a user-supervised classification process on the training information set.

The classifying the training information set may generate at least one of a data class definition, a characteristic measurement of a class, a class-based regression model, and a parameter selection used in the augmented geological service characterization process.

The generating the augmented geological service characterization process may include generating an augmented data acquisition protocol in response to the machine learning.

The generating the augmented geological service characterization process may include generating an augmented data analysis process in response to the machine learning.

The generating the augmented data analysis process may include generating an augmented workflow in response to the machine learning.

The generating the augmented data analysis process may include defining an augmented parameter used in the augmented data analysis process in response to the machine learning.

An embodiment of an apparatus may include an initialization unit configured to generate a geological service characterization process in response to one or more geological service objectives and a geological service experience information set. Additionally, the apparatus may include a machine learning unit configured to receive information generated in response to the geological service characterization process and configured to improve the geological service characterization process by machine learning in response to a training information set. The apparatus may further include a program execution unit configured to receive determination information from the machine learning unit and to generate an augmented geological service characterization process in response to the determination information.

An embodiment of a system may include a data acquisition system, a data processing device coupled to the data acquisition system, and a data storage system coupled to the data processing device. In an embodiment, the data acquisition system may obtain a measurement according to a data acquisition program. The data processing device may execute operations of an augmented analytics system. In an embodiment, the augmented analytics system may include an initialization unit configured to generate an geological service characterization process in response to one or more geological service objectives and an geological service experience information set, a machine learning unit configured to receive information generated in response to the geological service characterization process and configured to improve the geological service characterization process by machine learning in response to a training information set, and a program execution unit configured to receive determination information from the machine learning unit and to generate an augmented geological service characterization process in response to the determination information. In an embodiment, the data storage system may store the training information set.

Another embodiment of a method is described. In an embodiment, the method may include scanning an interpretation history information set, the interpretation history information set comprising information associated with a first geological service data interpretation project, extracting interpretation metadata from the interpretation history information set, and determining an interpretation setting for a second geological service data interpretation project in response to the metadata. Corresponding apparatuses and systems are also described.

In an embodiment, such a method may also include extracting acquired data from the interpretation history information set. Additionally, the method may include extracting a data interpretation workflow from the interpretation history information set, the data interpretation workflow including identification of an operation performed on the acquired data. In an embodiment, such a method may include extracting a parameter used in a data analysis of the operation. The method may also include extracting a quantity of interest obtained from the acquired data in response to the operation performed and the parameter used for the operation.

The method may include determining a quality factor associated with the interpretation metadata extracted from the interpretation history information set. In such an embodiment, the quality factor may be a weight value, the weight value being selected from a predetermined range of weight values. Such methods may also include analyzing an iterative interpretation, and wherein the weight value associated to a first iteration is lower than a weight value associated to a second iteration, wherein the first iteration occurred before the second iteration. In some embodiments, the quality factor is defined by a user input. In some embodiments the quality factor is associated with a specific domain.

In an embodiment of the method, the metadata includes at least one value selected from a group of values consisting of an identifier associated with an interpretation result, user information, stratigraphic information, geographic information, a parameter type, a parameter value, a timestamp associated with the interpretation, and a domain-specific value.

A method for generating a data acquisition program is also described. In an embodiment, the method includes receiving a geological service objective at an input interface, receiving a geological service experience information set at the input interface, automatically generating a specification of a set of measurements to be taken by a data acquisition system in response to the geological service objective and the geological service experience information set with a data processor coupled to the input interface, and providing an output comprising the specification of the set of measurements.

An apparatus configured to generate a data acquisition program is also described. In an embodiment, the apparatus includes an input interface configured to receive a geological service objective and a geological service experience information set, a data processor coupled to the input interface, the data processor configured to automatically generate a specification of a set of measurements to be taken by a data acquisition system in response to the geological service objective and the geological service experience information set, and an output interface coupled to the data processor, the output interface configured to provide an output comprising the specification of the set of measurements.

An embodiment of a method for defining a data analysis process is further described. In an embodiment, the method includes receiving a geological service objective at an input interface, receiving a measurement from a data acquisition system, generating a workflow for analyzing the measurement received from the data acquisition system in response to the geological service objective, and providing an output comprising the workflow.

An embodiment of an apparatus configured to generate a data analysis process is also described. In an embodiment the apparatus includes an input interface configured to receive a geological service objective and a measurement from a data acquisition system, a data processor coupled to the input interface and configured to generate a workflow for analyzing the measurement received from the data acquisition system in response to the geological service objective, and an output interface configured to provide an output comprising the workflow.

An embodiment of a method for processing and interpretation of geological service data is also described. In an embodiment, the method includes receiving a workflow at an input interface, receiving a measurement from a data acquisition system, determining a parameter for analyzing the measurement according to the workflow, analyzing the measurement according to the workflow using the parameter to determine a quantity of interest, and providing an output comprising the quantity of interest.

An embodiment of an apparatus configured to generate a data analysis process is described. In an embodiment, the apparatus includes an input interface configured to receive a workflow and a measurement from a data acquisition system, a data processor coupled to the input interface and configured to determine a parameter for analyzing the measurement according to the workflow, and analyze the measurement according to the workflow using the parameter to determine a quantity of interest, and an output interface configured to provide an output comprising the quantity of interest.

Embodiments of a method for augmenting a geological service characterization process are described. In an embodiment, the method includes receiving a measurement from a data acquisition system, the measurement acquired in response to a data acquisition program, receiving a workflow to analyze the measurement, receiving a parameter to analyze the measurement, receiving a quantity of interest generate according to the workflow and in response to the measurement and the parameter, storing the measurement, the workflow, the parameter, and the quantity of interest together in a training database as a training information set, performing a machine learning process using the training information set to generate an augmented geological service characterization process comprising an augmented data acquisition program, an augmented workflow, and an augmented parameter, and determining an enhanced quantity of interest in response to an augmented measurement received from the data acquisition system, the augmented measurement acquired in response to the augmented data acquisition program, the enhanced quantity of interest being determined in response to the augmented workflow and the augmented parameter.

In an embodiment, such a method may include adding at least one of the augmented measurement, the augmented data acquisition program, the augmented workflow, the augmented parameter and the enhanced quantity of interest to the training information set.

An embodiment of an apparatus configured to augment a geological service characterization process is described. Such an embodiment may include an input interface configured to receive: a measurement from a data acquisition system, the measurement acquired in response to a data acquisition program, a workflow to analyze the measurement, a parameter to analyze the measurement, and a quantity of interest generated according to the workflow and in response to the measurement and the parameter. The apparatus may also include a data storage device coupled to the input interface and configured to store the measurement, the workflow, the parameter, and the quantity of interest together in a training database as a training information set, an artificial intelligence unit coupled to the data storage device and configured to perform a machine learning process using the training information set to generate an augmented geological service characterization process comprising an augmented data acquisition program, an augmented workflow, and an augmented parameter, and a data processor coupled to the artificial intelligence unit and configured to determine an enhanced quantity of interest in response to an augmented measurement received from the data acquisition system, the augmented measurement acquired in response to the augmented data acquisition program, the enhanced quantity of interest being determined in response to the augmented workflow and the augmented parameter.

Although certain embodiments are described herein as an apparatus, one of ordinary skill will recognize that such an apparatus may be defined in a single integrated device, or alternatively, defined in a distributed system having components is more than one physical component. Thus, embodiments described as an apparatus, may be equally recognizable and defined as a system.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. It should be understood, however, that the detailed description and the specific examples are given by way of illustration only, and not by way of limitation. Various substitutions, modifications, additions, and/or rearrangements within the spirit and/or scope of the disclosure will become apparent to those skilled in the art.

One technical problem addressed by the present embodiments is related to retention of technical knowhow and expertise. Although prior methods for geological service characterization rely heavily on such expert knowledge and experience, the present embodiments may retain such knowledge in a training information set, and augment a geological service characterization process in response to determinations derived from the training information set using machine learning. Thus, in an example, the present disclosure and the accompanying claims provide a technical solution to the technical problem of retaining technical knowhow and expertise.

Beneficially, the present embodiments provide the technical benefits of capturing expert knowledge and experience in a consolidated information set, converting the captured expert knowledge and experience into an augmented geological service characterization process, which is augmented in response to the captured expert knowledge and experience. Further benefits include enhanced longevity or retention of the expert knowledge and experience, despite human resource changes, as well as improved consistency and reliability of geological service characterization results.

Figure 1:
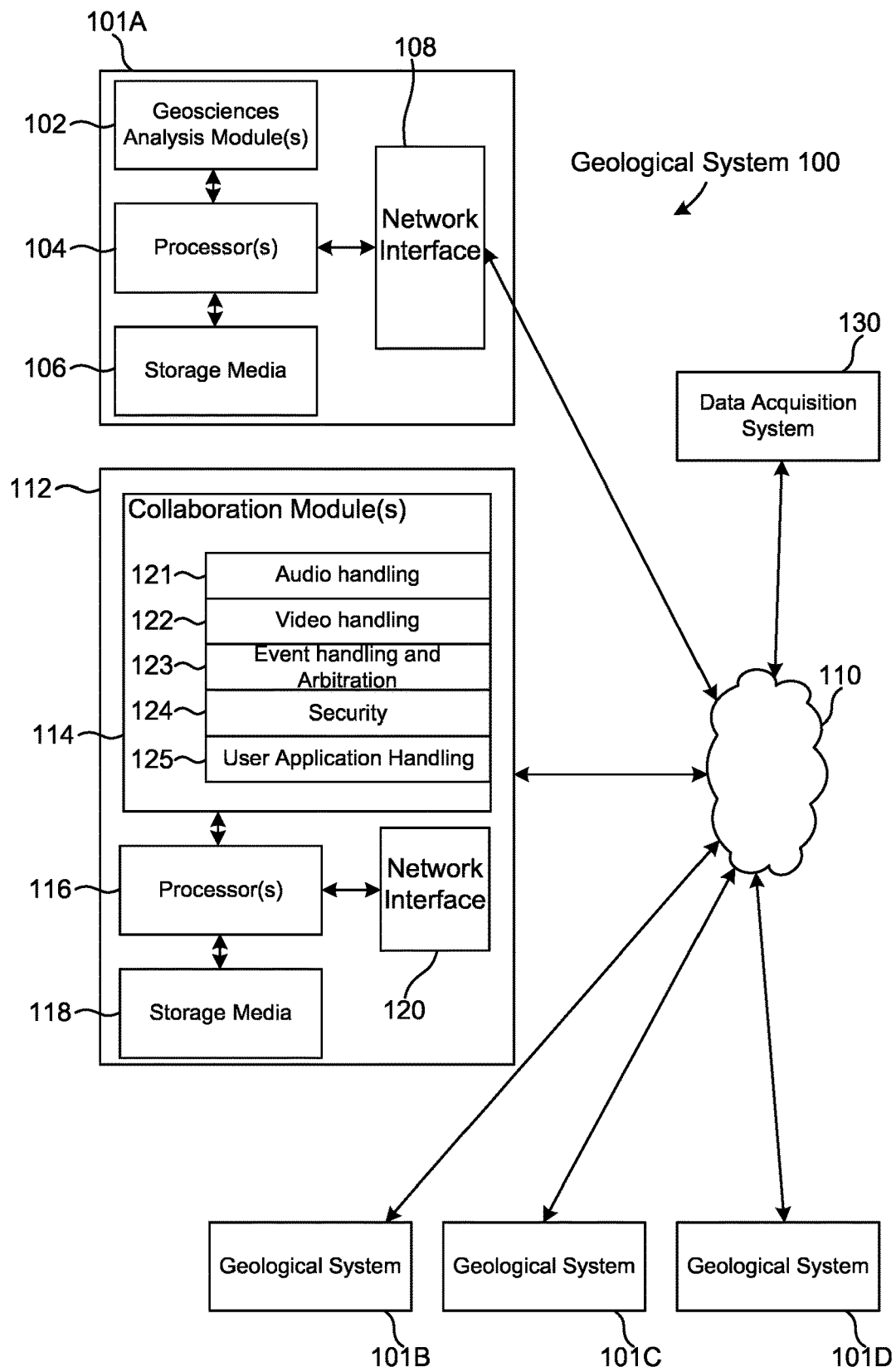
FIG. 1 is a schematic block diagram illustrating an embodiment of a system for augmented geological service characterization.

FIG. 1 depicts an example geological system 100 in accordance with some embodiments. The system 100 can be an individual system 101A or an arrangement of distributed systems. The system 101A includes one or more geosciences analysis modules 102 that are configured to perform various tasks according to some embodiments, such as one or more methods disclosed herein. To perform these various tasks, geosciences analysis module 102 executes independently, or in coordination with, one or more processors 104, which is (or are) connected to one or more storage media 106A. The processor(s) 104 is (or are) also connected to a network interface 108 to allow the system 101A to communicate over a data network 110 with one or more additional systems and/or systems, such as 101B, 101C, and/or 101D (note that systems 101B, 101C and/or 101D may or may not share the same architecture as system 101A, and may be located in different physical locations, e.g. systems 101A and 101B may be on a ship underway on the ocean, while in communication with one or more systems such as 101C and/or 101D that are located in one or more data centers on shore, other ships, and/or located in varying countries on different continents). Note that data network 110 may be a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 106A can be implemented as one or more computer-readable or machine-readable storage media. Note that while in the exemplary embodiment of FIG. 1 storage media 106A is depicted as within computer system 101A, in some embodiments, storage media 106A may be distributed within and/or across multiple internal and/or external enclosures of computing system 101A and/or additional computing systems. Storage media 106A may include one or more different forms of memory including semiconductor memory devices such as dynamic or static random access memories (DRAMs or SRAMs), erasable and programmable read-only memories (EPROMs), electrically erasable and programmable read-only memories (EE- PROMs) and flash memories; magnetic disks such as fixed, floppy and removable disks; other magnetic media including tape; optical media such as compact disks (CDs) or digital video disks (DVDs), BluRays or any other type of optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that system 101A is only one example and that system 101A may have more or fewer components than shown, may combine additional components not depicted in the example embodiment of FIG. 1, and/or system 101A may have a different configuration or arrangement of the components depicted in FIG. 1. The various components shown in FIG. 1 may be implemented in hardware, software, or a combination of both hardware and software, including one or more signal processing and/or application specific integrated circuits.

It should also be appreciated that system 100 may include user input/output peripherals such as keyboards, mice, touch screens, displays, etc. The system 100 may include desktop workstations, laptops, tablet computers, smartphones, server computers, etc.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with hardware are all included within the scope of the disclosure.

Geosciences collaboration system 112 includes processor(s) 116, storage media 118, and network interface 120, which in some embodiments may be analogous to the processor(s), storage media, and network interfaces discussed with respect to system 100A. Geosciences collaboration system 112 also includes collaboration module(s) 114. In this example there are a number of modules designed to facilitate communication, content delivery, security, collaborative application handling, and other functions needed to facilitate geosciences collaboration by users at one or more of the systems 101A, 101B, 101C, and/or 101D. Specifically, collaboration module 114 may include the following submodules.

Audio handling submodule 121 provides for recording and delivery of sound (e.g., speech, computing system events, etc.) from one system, such as system 101A, to one or more systems in the geosciences collaboration (e.g., systems 101B and 101C).

Video handling submodule 122 provides for capture and delivery of displayed content (e.g., the display of video from a system running a geosciences application) from one system, such as system 101A, to one or more systems in the geosciences collaboration (e.g., systems 101B and 101C).

User Application handling submodule 125 provides for application handling in the geosciences collaboration amongst a plurality of systems. For example, a user may invoke an application on system 101A that he/she wishes to share and collaborate on with others at systems 101B and 101C. Geosciences collaboration system 112 may communicate via appropriate means (e.g., multi-system interprocess control mechanisms such as sockets, RPC, etc.) with system 101A to obtain necessary information to facilitate collaboration between users at systems 101A, 101B, and 101C.

Of course, in some embodiments, one or more of the systems in the collaboration may be in a "listen and see only" mode where the application(s), whiteboard(s), and/or other elements of the collaboration are only broadcast from one system to another. In some embodiments, this may be accomplished by configuring User Application handling submodule 125 to be in a broadcast mode.

Event handling and arbitration submodule 123 provides control so that respective inputs from a plurality of users on a plurality of systems in the geosciences collaboration are handled in an appropriate way, e.g., the sequence as originally input amongst the users, conflicting inputs or instructions generate appropriate actions, etc.

Security submodule 124 may control access to the geosciences collaboration to only the systems specifically given access to the content of the geosciences collaboration.

Data acquisition system 130 may include systems, sensors, user interface terminals, and the like, which are configured to receive data corresponding to records collected at an oil services facility, such as an exploration unit, oil drilling rig, oil or gas production system, etc. Acquired data may include sensor data, employee log data, computer generated data, and the like.

Figure 2:
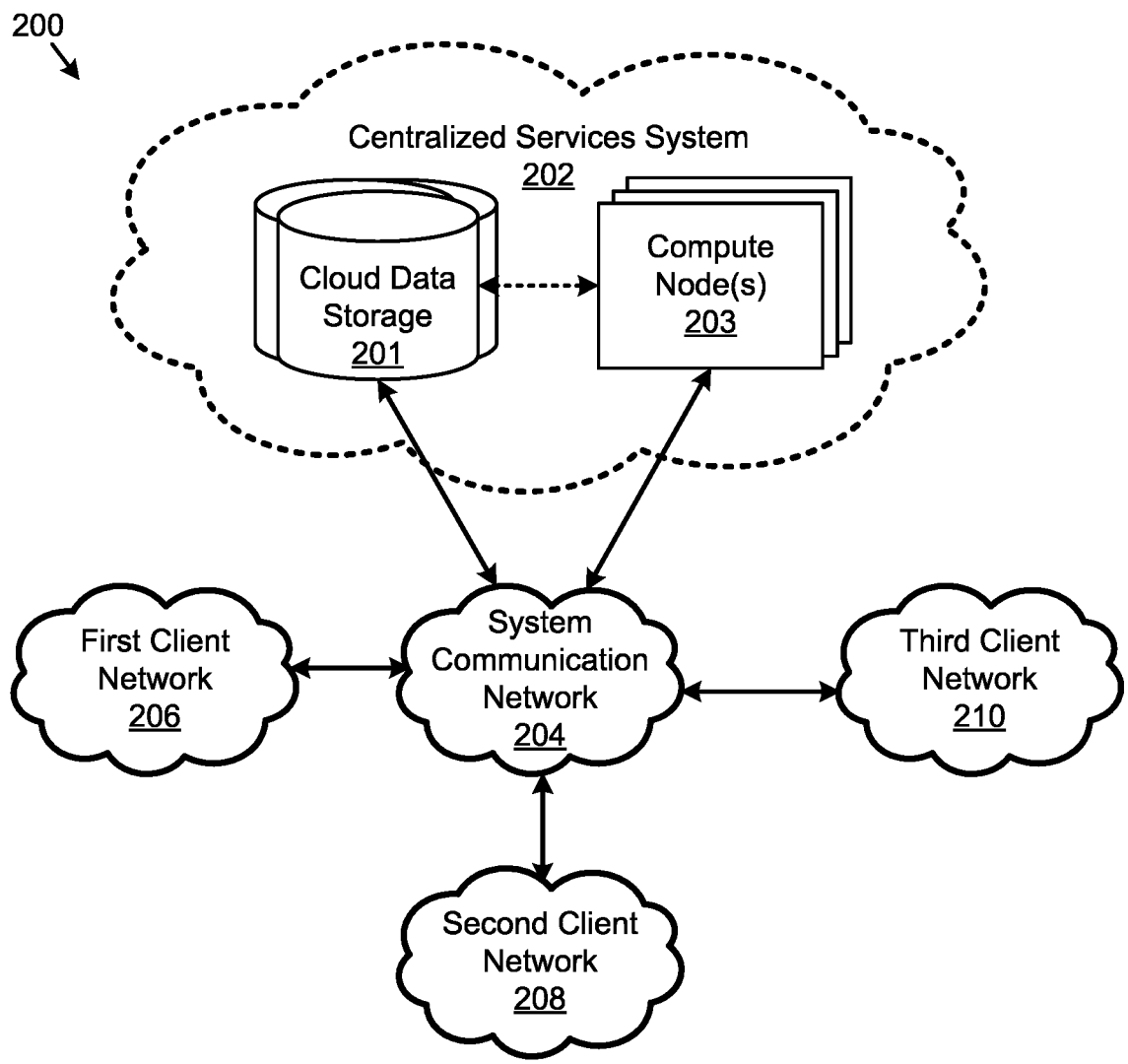
FIG. 2 is a schematic block diagram illustrating an embodiment of a system for augmented geological service characterization.

With reference to FIG. 2, a multi-client system 200 may include a centralized services system 202, which may be implemented on a cloud services system, for example. In such an embodiment, the centralized services system 202 may include one or more cloud data storage systems 201 and one or more compute nodes 203. In such an embodiment, the system 200 may include multiple client networks, including a first client network 206, a second client network 208, and a third client network 210. Each client network 206-210 may communicate with the centralized services system 202 via a system communication network 204, which may be the Internet or a dedicated WAN connection.

In such embodiments, each of the client networks 206-210 may include components described in FIG. 1, such as the computer systems 101A-D and the data acquisition system 130, etc. Such devices may be further connected via an internal network 110. In an embodiment, the first client network 206 may be operated by a first customer of a data analysis system provider. In another embodiment, the second client network 208 and the third client network 210 may both be operated by a second customer, but at separate geographic locations. One of ordinary skill will recognize a variety of client/customer relationships that may be established.

In such an embodiment, each of the client networks 206-210 may communicate with the centralized services system 202 for data storage and implementation of certain centralized data processing and analysis processes. Beneficially, the centralized services system 202 may be configured for large scale data storage and data processing. In one such embodiment, the data storage may be dynamically scalable according to the service provider's needs and according to each customer's needs. In embodiments where customer data is handled or managed by the service provider at the centralized services system 202, confidential customer data may be separated into distinct and secure logical volumes on the cloud data storage 106. Similarly, the data may be processed on separate and secure compute nodes 203 for each customer to maintain data security. Other non-confidential data, such as user behavioral data may be stored in an aggregated or consolidated database.

In one example, an oil and gas customer may establish the first client network 206 which may include one or more data acquisition systems 130 for collecting wellbore data at one or more oil and/or gas well sites. Additionally, the first client network 206 may include a computer system 101B-D for analyzing the data acquired by the data acquisition systems 130. In such an embodiment, a second oil and gas customer may establish a second client network 208 having a similar configuration. In such an embodiment, both the first client network 206 and the second client network 208 may communicate with the centralized services system 202 over the system communication network 204.

In such an embodiment, a first logical volume may be established on the cloud data storage 201 for storing proprietary data received from the first client network 206 and a second logical volume may be established on the cloud data storage 201 for storing proprietary data received from the second client network 208. Additionally, a third logical volume may be established on the cloud data storage 201 for storing a centralized database of data used for training or machine learning purposes. Similarly, a fourth logical volume may be established on the cloud data storage 201 for storing a centralized database of historical metadata and statistics associated with a predictive model used for analysis of data entries in the proprietary data stored in the first logical volume and/or the second logical volume.

Similarly, multiple compute nodes 203 or processing threads may be generated to perform operations described below with relation to FIGS. 3-4. In one such embodiment the multiple compute nodes 203 may perform parallel processing to improve overall processing times.

Figure 3:
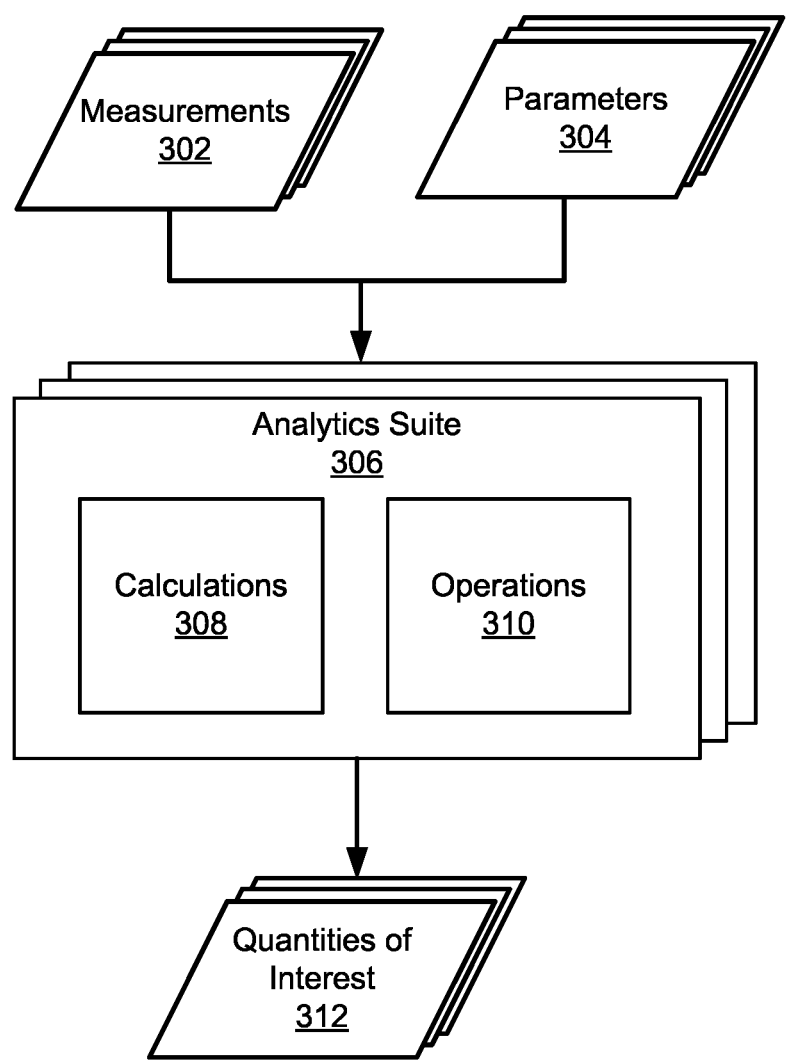
FIG. 3 is a logical diagram illustrating an embodiment of process for geological service characterization.

FIG. 3 is a logical diagram illustrating an embodiment of a process for geological service characterization. In the embodiment of FIG. 3, one or more measurements 302 may be received. For example, the measurements 302 may be obtained from a data acquisition system 130 in accordance with a data acquisition program. One or more parameters 304 may also be obtained. The parameters 304 may be used by components of the analytics suite 306 as initial conditions, constraints, weight values, or the like. The parameters 304 may facilitate performance of one or more calculations 308 or operations 310 executed according to components of the analytics suite 306. In an embodiment, the analytics suite 306 may include modules, classes, or functions capable of performing various operations 310 and calculations 308. Alternatively, the analytics suite 306 may include a collection of analytics modules, each configured to perform specialized calculations 308 and/or operations 310. In response to the measurements 302 and the parameters 304, the analytics suite 306 may generate one or more quantities of interest 312.

Figure 4:
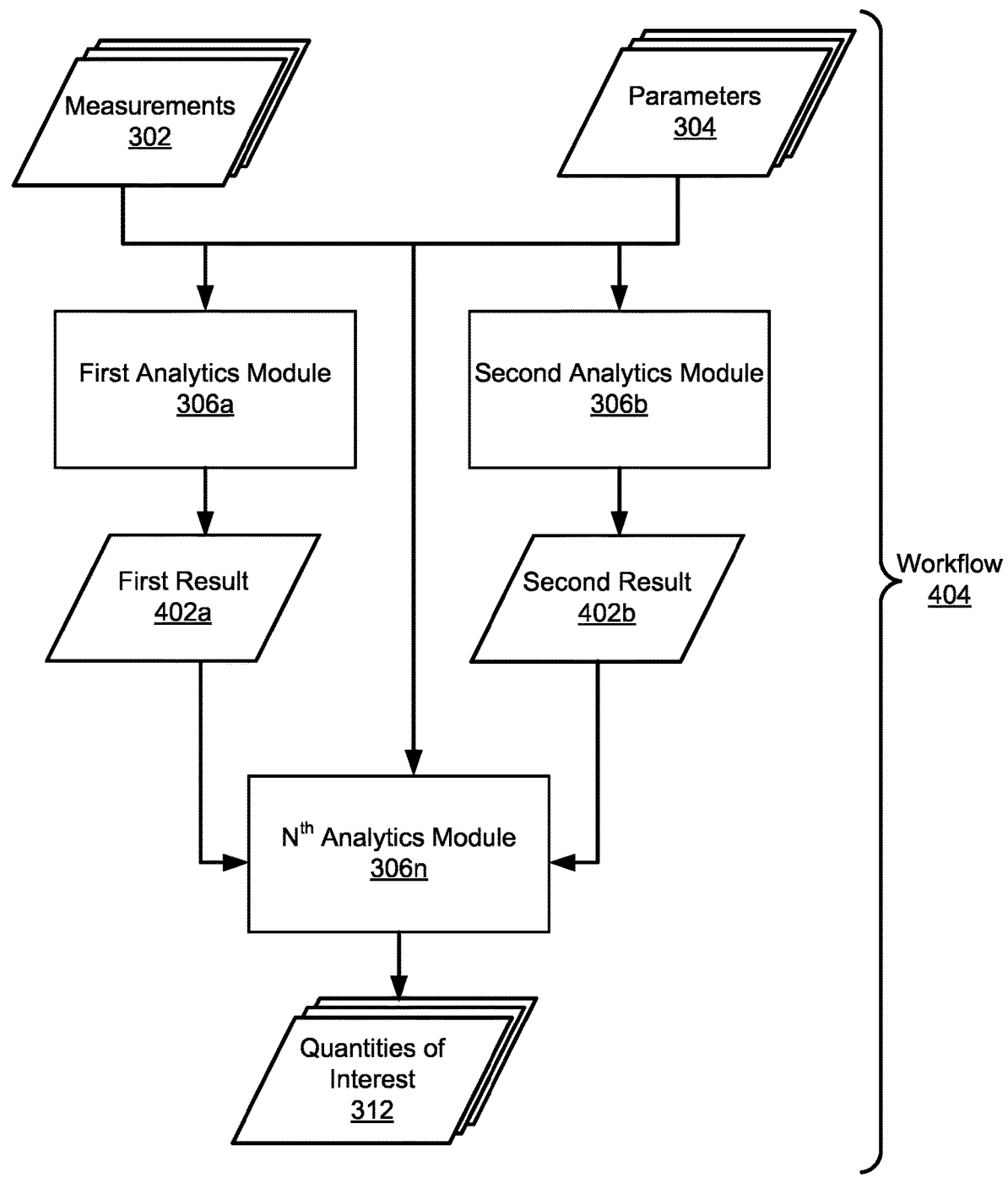
FIG. 4 is a logical diagram illustrating an embodiment of process for geological service characterization.

FIG. 4 is a logical diagram illustrating an embodiment of a process for geological service characterization. The embodiment of FIG. 4 illustrates an example of a system in which the measurements 302 are analyzed according to a suite of multiple analytics modules. For example, the measurements 302 and parameters 304 may be passed to a first analytics module 306a to obtain a first result 402a, and to a second analytics module 306b to obtain a second result 402b. The first result 402a and the second result 402b may be processed in combination with parameters 304 and measurements 302 by an Nth analytics module 306n to obtain one or more quantities of interest 312. In such an embodiment, the set of obtained measurements 302 and parameters 304, along with the sequence of processing steps performed by the analytics modules 306a-n may define a workflow 404. One of ordinary skill will recognize that various embodiments of a workflow 404 may be used, depending upon the specific analytics objectives.

Figure 5:
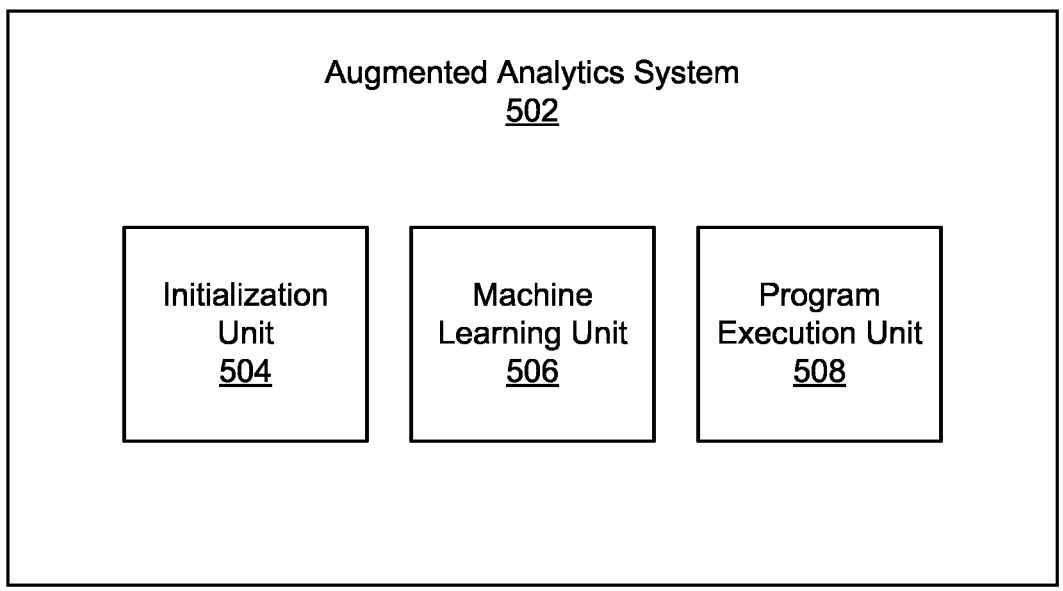
FIG. 5 is a schematic block diagram illustrating an embodiment of an apparatus for augmented geological service characterization.

FIG. 5 is a schematic block diagram illustrating an embodiment of an apparatus for augmented geological service characterization. In an embodiment, the apparatus may include a data processing device configured to operate an augmented analytics system 502. The data processing device may be the processor 116 in an embodiment. Alternatively, the data processing device may be a compute node 203 of the centralized services system 202. The augmented analytics system 502 may include an initialization unit 504, a machine learning unit 506, and a program execution unit 508 in some embodiments.

Figure 6:
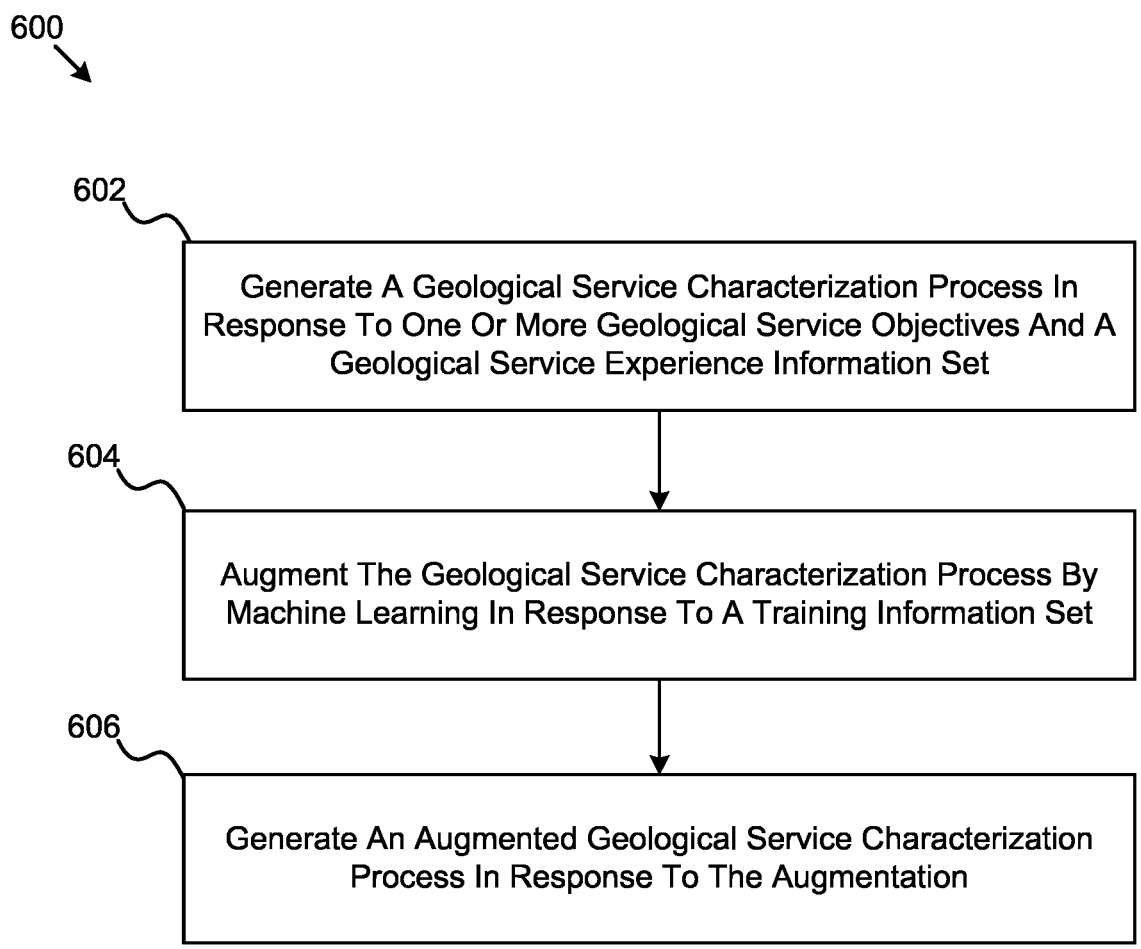
FIG. 6 is a schematic flowchart diagram illustrating an embodiment of a method for augmented geological service characterization.

FIG. 6 is a schematic flowchart diagram illustrating an embodiment of a method 600 for augmented geological service characterization. In an embodiment, the initialization unit 504 may generate a geological service characterization process in response to one or more oil service objectives and an oil service experience information set, as shown at block 602. The machine learning unit 506 may be configured to augment the oil service characterization process by machine learning in response to a training information set, as shown at block 604. In an embodiment, the program execution unit 508 may be configured to generate an augmented oil service characterization process in response to the augmented oil service characterization process, as shown at block 606. In an embodiment, the augmentation may include optimization. In an embodiment, the augmentation may include enhancement or improvement, but not necessarily to a point of optimization. Various alternative embodiments of the method 600 may be used.

Figure 7A:
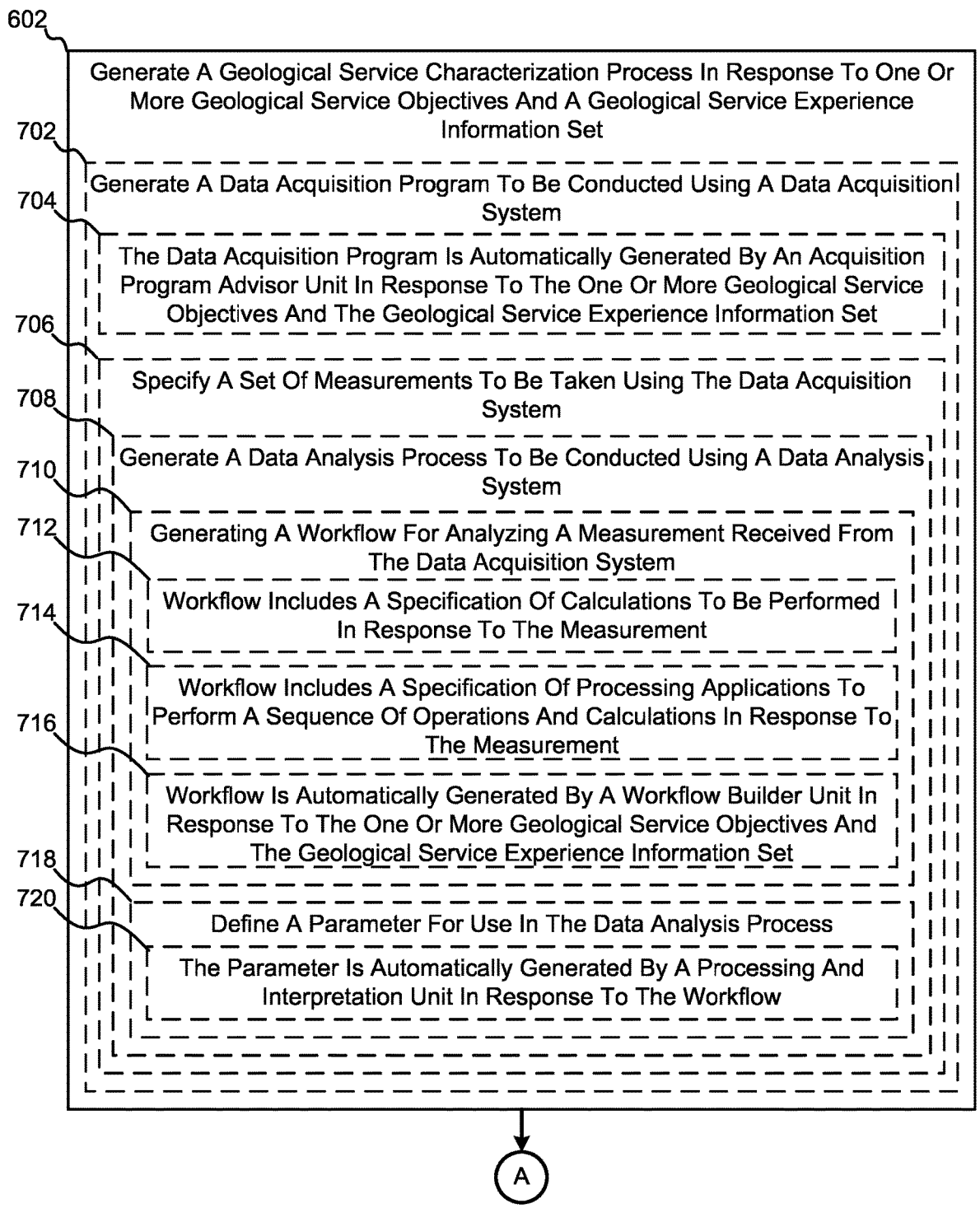
FIG. 7A is a schematic flowchart diagram illustrating an embodiment of a method for augmented geological service characterization.
Figure 7B:
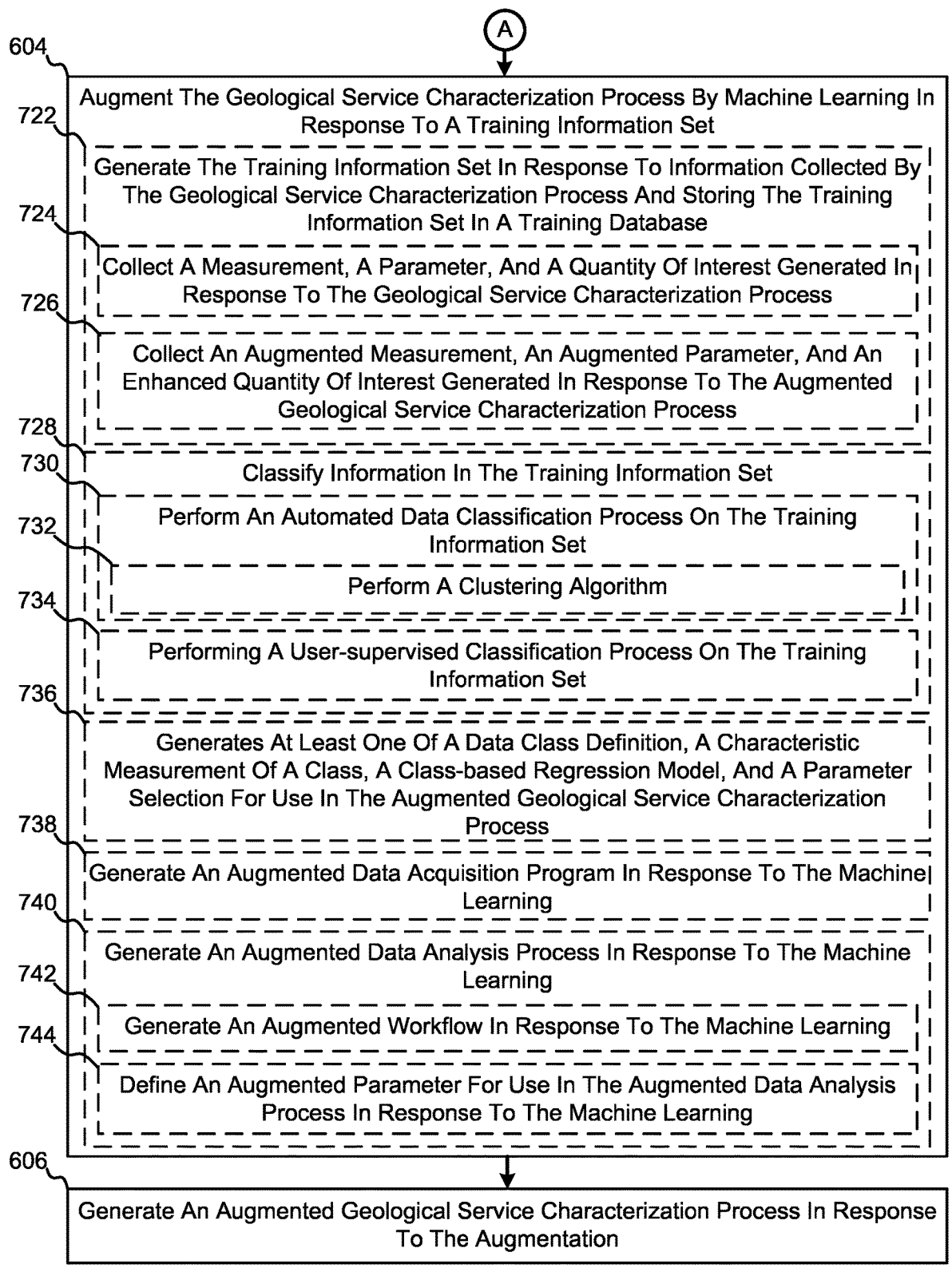
FIG. 7B is a schematic flowchart diagram illustrating an embodiment of a method for augmented geological service characterization.

FIGS. 7A-7B illustrate embodiments of methods for augmented geological service characterization. In an embodiment, the method includes steps described in FIG. 6, including generating a geological service characterization process 602, augmenting the geological services characterization process 604, and generating an augmented geological service characterization process in response to the augmentation 606.

As shown in FIG. 7A, generating the geological service characterization process 602 may include one or more further, or alternative, or optional elements. For example, in an embodiment, block 602 may include generating a data acquisition program to be conducted using a data acquisition system at block 702. In an embodiment, the data acquisition program is automatically generated by an acquisition advisor unit in response to the one or more geological service objectives and the geological service experience information, as shown at block 704. At block 706, the method may include specifying a set of measurements to be taken using the data acquisition system. The method may also include generating a data analysis process to be conducted using a data analysis system as shown at block 708. Such an embodiment may include generating a workflow for analyzing a measurement received from the data acquisition system as shown at 710. As shown at 712, the workflow may include a specification of calculations to be performed in response to the measurement. The workflow may also include a specification of processing applications to perform a sequence of operations and calculations in response to the measurement as shown at 714. The workflow may be automatically generated by a workflow builder unit in response to the one or more geological service objectives and the geological service experience information set as shown at 716. The method may further include defining a parameter for use in the data analysis process as shown at 718. The parameter may be automatically generated by a processing and interpretation unit in response to the workflow as shown at 720. The embodiment of the method continues at FIG. 7B, where augmenting the geological service characterization process 604 is further described. In an embodiment the method includes generating the training information set in response to information collected by the geological service characterization process and storing the training information set in a training database as shown at 722. Such an embodiment may include collecting a measurement, a parameter, and a quantity of interest generated in response to the geological service characterization process as shown at 724. Such an embodiment may also include collecting an augmented measurement, an augmented parameter, and an enhanced quantity of interest generated in response to the augmented geological service characterization process as shown at 726. In an embodiment, the method includes classifying information in the training information set as shown at 728. Classifying the information may include performing an automated data classification process on the training information set, for example using a clustering algorithm as shown at 730 and 732 respectively. Classifying may also include performing a user-supervised classification process on the training set as shown at 734. The method may include generating at least one of a data class definition, a characteristic measurement of a class, a class-based regression model, and a parameter selection for use in the augmented geological service characterization process as shown at 736. At 738, the method may include generating an augmented data acquisition protocol in response to the machine learning. The augmented data acquisition protocol may include a data acquisition program. The method may also include generating an augmented data analysis process in response to the machine learning as shown at 740. For example, such an embodiment may include generating an augmented workflow in response to the machine learning as shown at 742. Also, such an embodiment, may include defining an augmented parameter for use in the augmented data analysis process in response to the machine learning as shown at block 744.

One of ordinary skill will recognize that the various embodiments of the methods described in FIGS. 6-7B may be used in varying orders or sequences. Some steps or options may be omitted, and additional steps or option may be added within the scope of the described embodiments. Various combinations of method elements may be used according to specific system or processing objectives. The methods are implemented in one or more of the embodiments of apparatuses and systems described herein.

Figure 8:
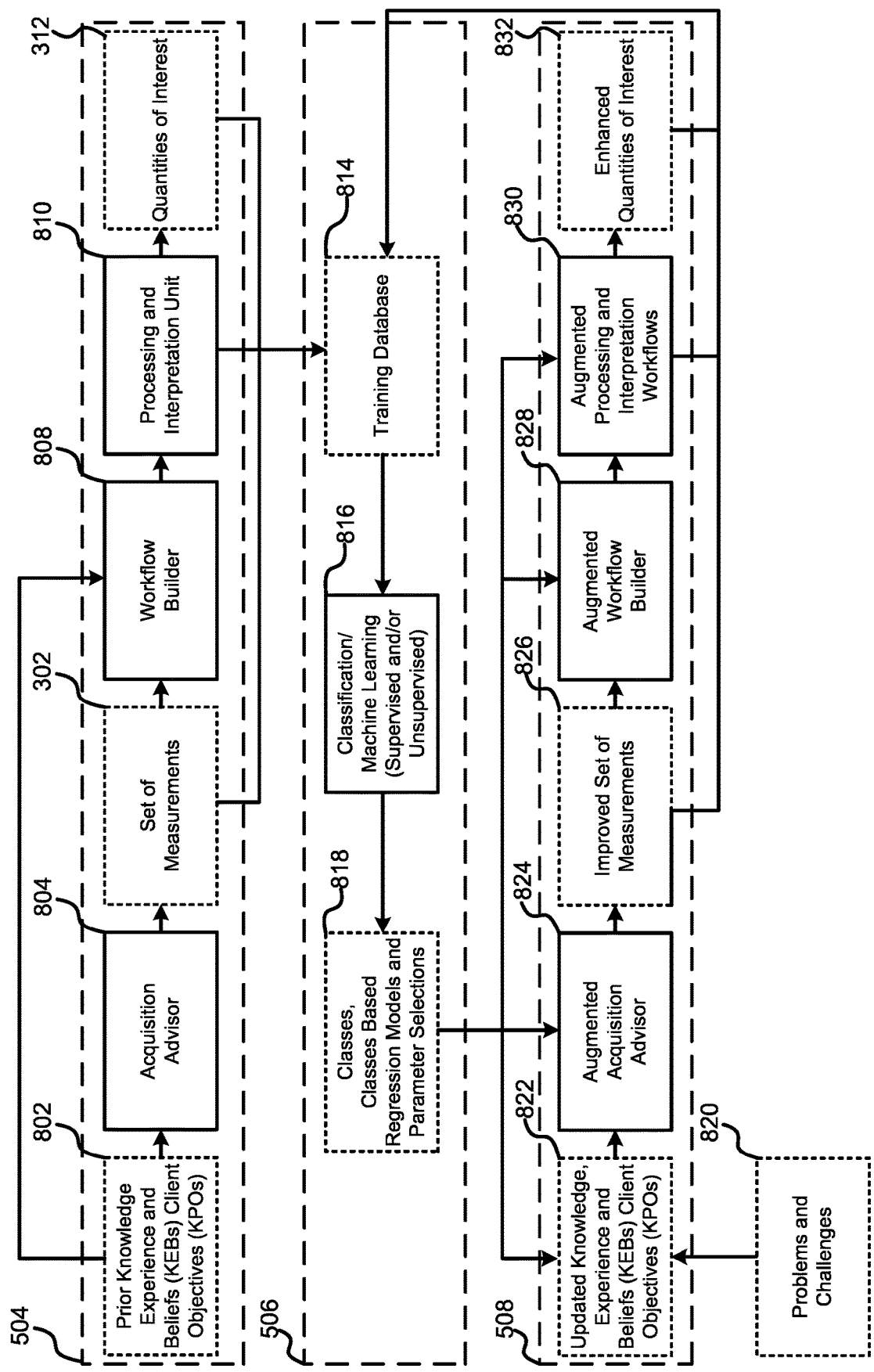
FIG. 8 is a schematic processing diagram illustrating a process flow in an embodiment of an apparatus for augmented geological service characterization.

FIG. 8 is a schematic flowchart diagram illustrating an embodiment of a method for augmented geological service characterization. In an embodiment, the method includes operations performed by the initialization unit 504, the machine learning unit 506, and the program execution unit 508. The process may start with receiving prior knowledge, experience, and beliefs regarding the oil service performed, as well as client objectives, as illustrated at block 802. In the borehole example, prior knowledge, experience, and beliefs may include analogues or data regarding similar projects, borehole seismic data, offset field and well data, reservoir properties, drilling performance and well construction related data, and user experience and beliefs. Experience may also include parameters used for processing and interpretation from past projects. The knowledge, experience, and beliefs may be collected and analyzed to define data analysis objectives. Tradeoffs between the data analysis objectives and the client objectives may be balanced by the acquisition advisor to determine a data acquisition program and a workflow.

In this embodiment, client objectives may be based on well construction and field development targets. Client objectives may include certain cost limitations, both for exploration and for production. Additional client objectives may include accuracy of measurements, rates of production, duration of production, etc. Attitude toward risk is another client objective that may be assessed. For example, a client may wish to limit risk to a 15% margin of error in predictive calculations, but may wish to limit cost within a certain predefined budget. The present embodiments may receive all of these factors, in addition to information about the location and geology of the site, and use these inputs for development of a workflow 404.

The data acquisition program may be generated by the acquisition advisor 804, and may define a set of measurements 302 to be obtained by the data acquisition system 130. For example, if the client wants to know how many barrels of oil is contained in an underground reservoir within a 30% margin of error and under a predetermined cost threshold, the acquisition advisor 804 may automatically determine the data acquisition program, in response to these inputs, and in response to the capabilities of the data acquisition system 130, the location and geology of the site, and other pertinent inputs. In another embodiment, the acquisition advisor 804 may receive manual inputs from a user for initial data acquisition.

In an embodiment, the acquisition advisor 804 uses client objectives and set of prior knowledge, experience and beliefs as inputs and then advises on the set of measurements to acquire to satisfy client objectives. The process may use methods such as heuristics, decision trees, Bayesian beliefs and other model selection algorithms. Multiple acquisition scenarios are generated, and corresponding uncertainties may be estimated using modeling and inversion tools. Finally, an acquisition scenario is chosen which satisfies client objectives based on uncertainty and other constraints. In an embodiment, a set of measurements 302 are acquired by the data acquisition system 130 based on the recommendations of acquisition advisor 804.

In an embodiment, the workflow builder 808 may generate the workflow 404 according to an automated or manual process to create specific processing and interpretation workflows 404, based on client objectives, constraints and acquired set of measurements, to utilize for augmented processing and interpretation, the determination being in response to the client's objectives and the prior knowledge experience and beliefs as shown at block 802. A workflow 404 may define a family of algorithms, applications, and workflows to convert raw measurement data 302 into a quantity of interest 312. It may include, but is not limited to, environmental corrections, inversion process to obtained geophysical parameters, inversion process to obtain reservoir parameters, production modeling, and multi-physics inversion workflows. In some embodiments, these workflows include two parts: processing and interpretation.

In an example, the measurements 302 include quantities such as resistivity and bulk density. The client may request quantities of interest 312, such as porosity and water saturation or oil volume. The workflow 404 defines the operations 310 and calculations 308 required to determine the quantities of interest 312 from the measurements 302. In such embodiments, the quantities of interest 312 may not be directly measured, and may be determined indirectly through computation, inference, and interpretation of the results of the operations 310 and calculations 308 performed on the measurements 302.

Upon completion of an initial workflow 404, the set of measurements 302, the parameters 304, the list and sequence of calculations 308 and operations 310, and the quantities of interest 312 are stored in the training database 814. The training database 814 may include information generated by a historical set of data acquisition, processing, and interpretation projects, which may be referred to as legacy data. In addition, the training database 814 may include industry standard information, for example petrophysical models such as Archie models, Waxman-Smits models, Shaly-sand models, and the like.

The training classification and machine learning module 816 may use the information stored in the training database 814 to enhance the processes described above. Classification may be unsupervised using clustering techniques or supervised (user driven, geological etc.) using machine learning or a combination of both. Output of classification may include classes, characteristic measurements of classes and class-based regression model, as shown at block 818.

Machine learning modeling may include data acquisition, data cleaning, feature selection, modeling, and prediction. In an embodiment, data acquisition is an initial step. The historical data is used to train a model and may be referred to as training data. The data may be preprocessed before it is used for predictive analytics. Preprocessing may include slicing sub-sections of data, censoring data based on pre-defined conditions, randomly sampling a percentage of rows, removing outliers, dynamic time warping, and general formatting to put the data into a form that can be fed into a machine learning algorithm. Features may include attributes of a data set that could contain correlations to a given output. Feature selection may include determining an output that should be modeled. Determining an output may be driven by domain knowledge. After appropriate outputs have been selected for modeling, the input features may be identified. Data modeling may include the set of statistical and physics based tools and methods which take in the input features determined in the previous step, and then provide a prediction for the output. Two major approaches to data modeling are physics based modeling and data-driven modeling. Physics based modeling uses traditional physics equations derived from first principles to describe the behavior of a given system. Another way is to use machine learning models. These are methods which use historical data to train a model. Training a model involves feeding the algorithm data and then iteratively adjusting a set of model parameters to reduce the model error as compared to a testing set of data. When a model has been augmented using a set of training data, it can then be used to predict new data.

In an embodiment, the model is used by the augmented analytics system 502 to generate an augmented workflow 830 and enhanced quantities of interest 832. An updated set of knowledge, experience, and beliefs, and client objectives may be obtained at block 822. The augmented acquisition advisor 824 may recommend an improved set of measurements for the next project, using updated client objectives and knowledge, experience and beliefs, as well as observed problems and results from the classification step as shown in block 818. The data acquisition system 130 may obtain an improved set of measurements as shown at block 826, according to an augmented acquisition program generated by the augmented acquisition advisor 824. The augmented workflow builder 828 may create processing and interpretation workflows using updated client objectives and acquired measurements. Results from the classification step may also be input to the builder.

In an embodiment, the augmented processing and interpretation workflows may use classification results, including class-based regression models, to augment the workflow for the class and measurements specific interpretation. Augmentation may be a fully automatic processing and interpretation process, that does not require manual intervention, and may be applied in real time or near real time. Augmentation may include a customized exposure of key parameters for setting by expert interpreters. In an embodiment, suitable processing parameters that have been used in the previous projects in the same field or in analog projects or formations can also be used to augment the processing of raw measured data as described below with reference to FIGS. 15-16.

Enhanced quantities of interest 832 may be generated by augmented workflows 830 using the improved set of measurements 826 to solve for class-based enhanced quantities of interest 832, which are then used to update client objectives and set of knowledge, experience and beliefs in the training database 814. The augmented acquisition program, improved set of measurements 826, augmented parameters, augmented workflow, and enhanced quantities of interest 832 may all be added to the training database 814 for further improvement of the machine learning process 816. These steps may be repeated in a closed form loop to continuously augment and automate acquisition, processing and interpretation.

The described embodiments, and in particular the individual steps and the ordered combination of steps provided therein, provide several advantages over prior systems and manual processes. For example, the embodiments may allow for the creation of new workflows that propagate knowledge from one project or employee to another project in the same field. An additional benefit is to open the possibility for a real-time processing and interpretation of single-project logging data (by having an automatic and smart learning system). A further benefit is to improve net-present-value (NPV) based on acquisition and completion cost versus benefit. Additionally, the present embodiments may improve domain expert utilizations, and identify gaps and needs for high-end measurements for solving a complex problem. Although the description of the embodiments above discuss single-well logging data processing and interpretation (such as petrophysics), the present embodiments are also applicable to other geological, geophysical, production, drilling and reservoir engineering services.

Figure 9:
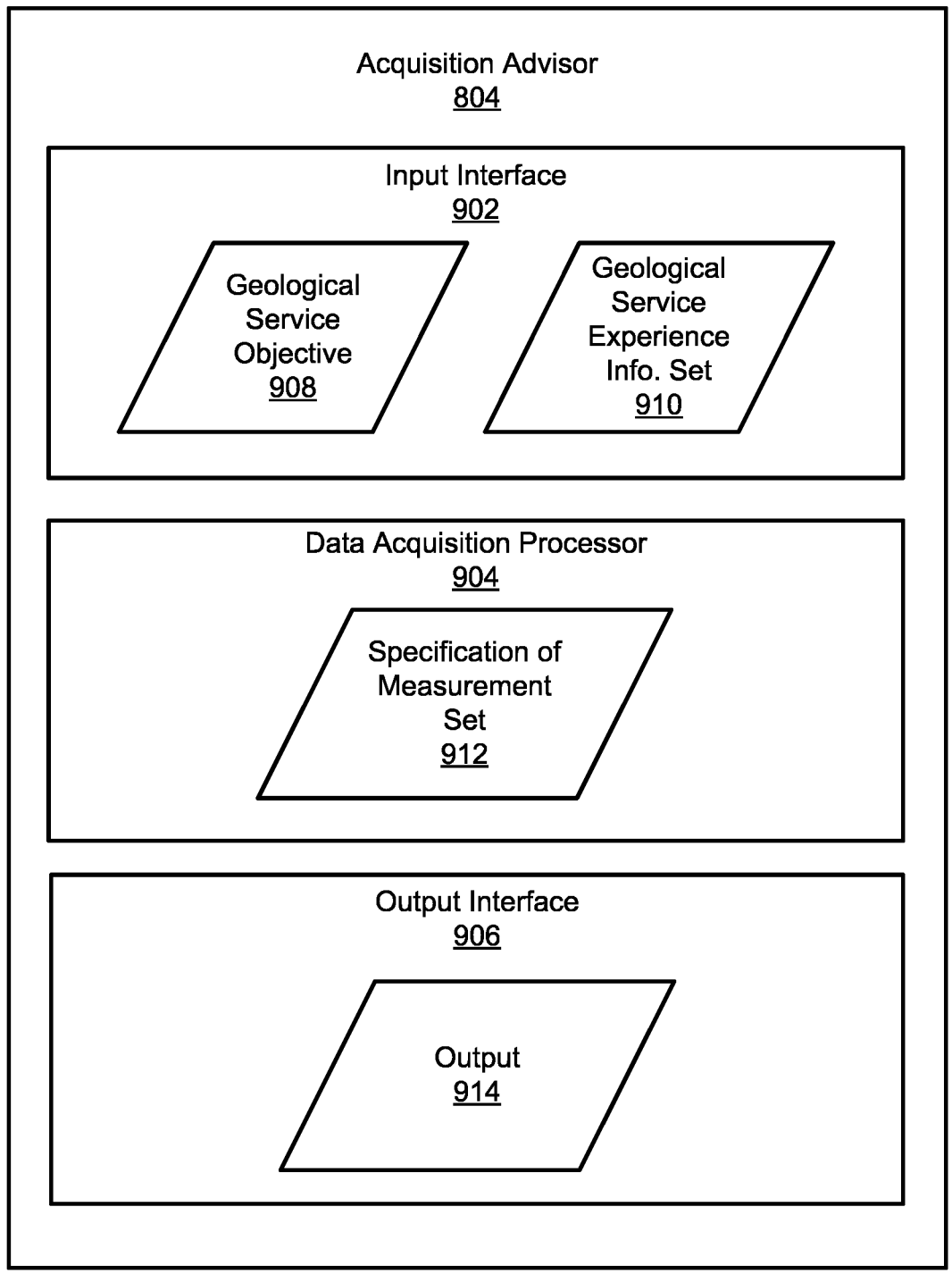
FIG. 9 is a schematic block diagram illustrating an embodiment of an apparatus configured to generate a data acquisition program.

An apparatus configured to generate a data acquisition protocol is shown in FIG. 9. The generated data acquisition protocol may be provided by a data acquisition program. In an embodiment, the apparatus includes the acquisition advisor 804. The acquisition advisor 804 may include an input interface 902, a data acquisition processor 904, and an output interface 906. In an embodiment, the input interface 902 may receive a geological service objective 908 and a geological service experience information set 910. The data acquisition processor 904 may be coupled to the input interface 902. In an embodiment, the data acquisition processor 904 may automatically generate a specification 912 of a set of measurements to be taken by a data acquisition system 130 in response to the geological service objective 902 and the geological service experience information set 904, and an output interface 906 coupled to the data acquisition processor. The output interface provides an output including the specification of the set of measurements.

Figure 10:
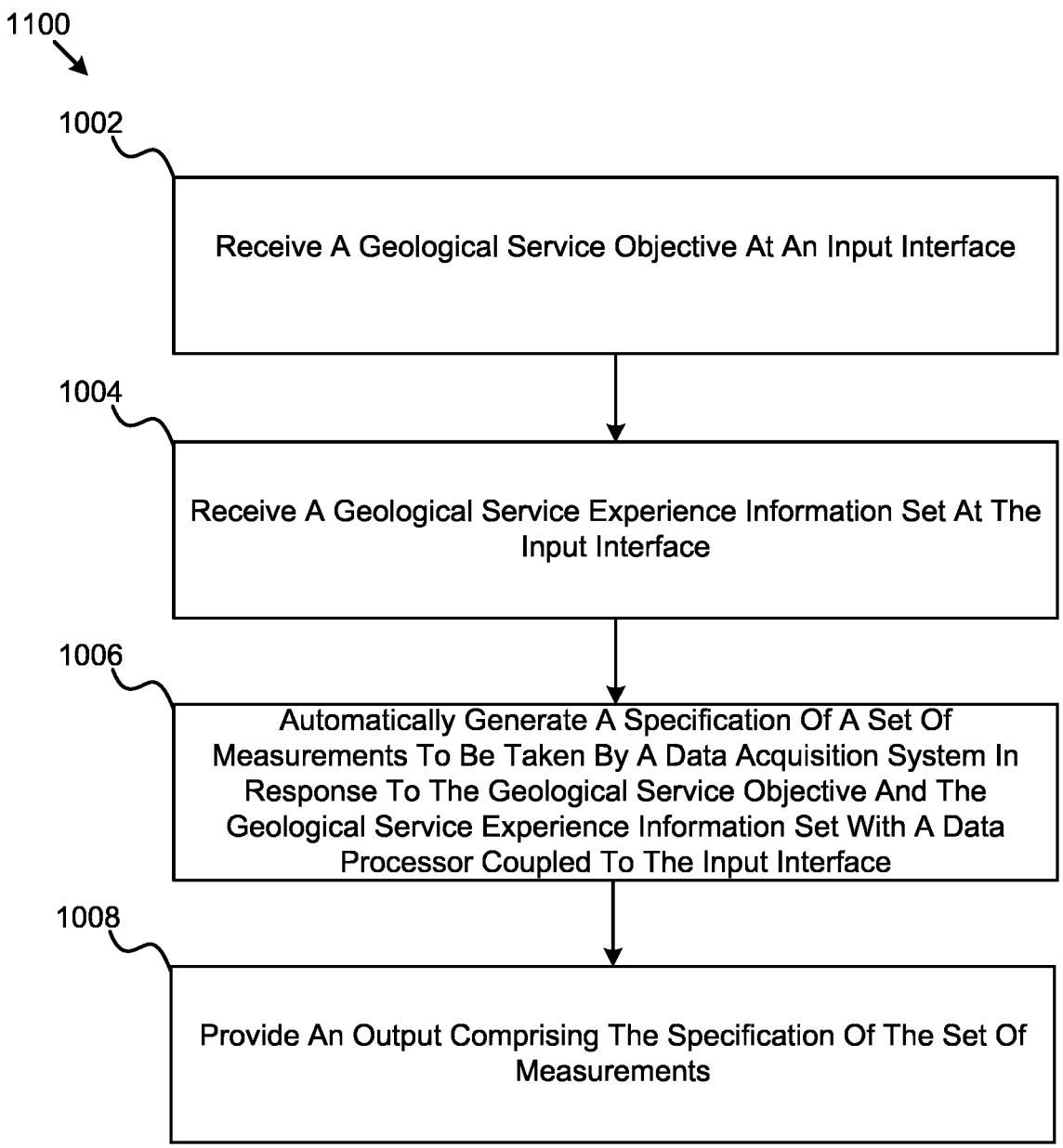
FIG. 10 is a schematic flowchart diagram illustrating an embodiment of a method for generating a data acquisition program.

An embodiment of a method 1000 for generating a data acquisition program is described in FIG. 10. The method 1000 includes receiving a geological service objective at an input interface, as shown at block 1002. At block 1004, the method 1000 includes receiving a geological service experience information set at the input interface. The method 1000 also includes automatically generating a specification of a set of measurements to be taken by a data acquisition system 130 in response to the geological service objective and the geological service experience information set with a data processor coupled to the input interface, as shown at block 1006. At block 1008, the method 1000 provides an output comprising the specification of the set of measurements.

Figure 11:
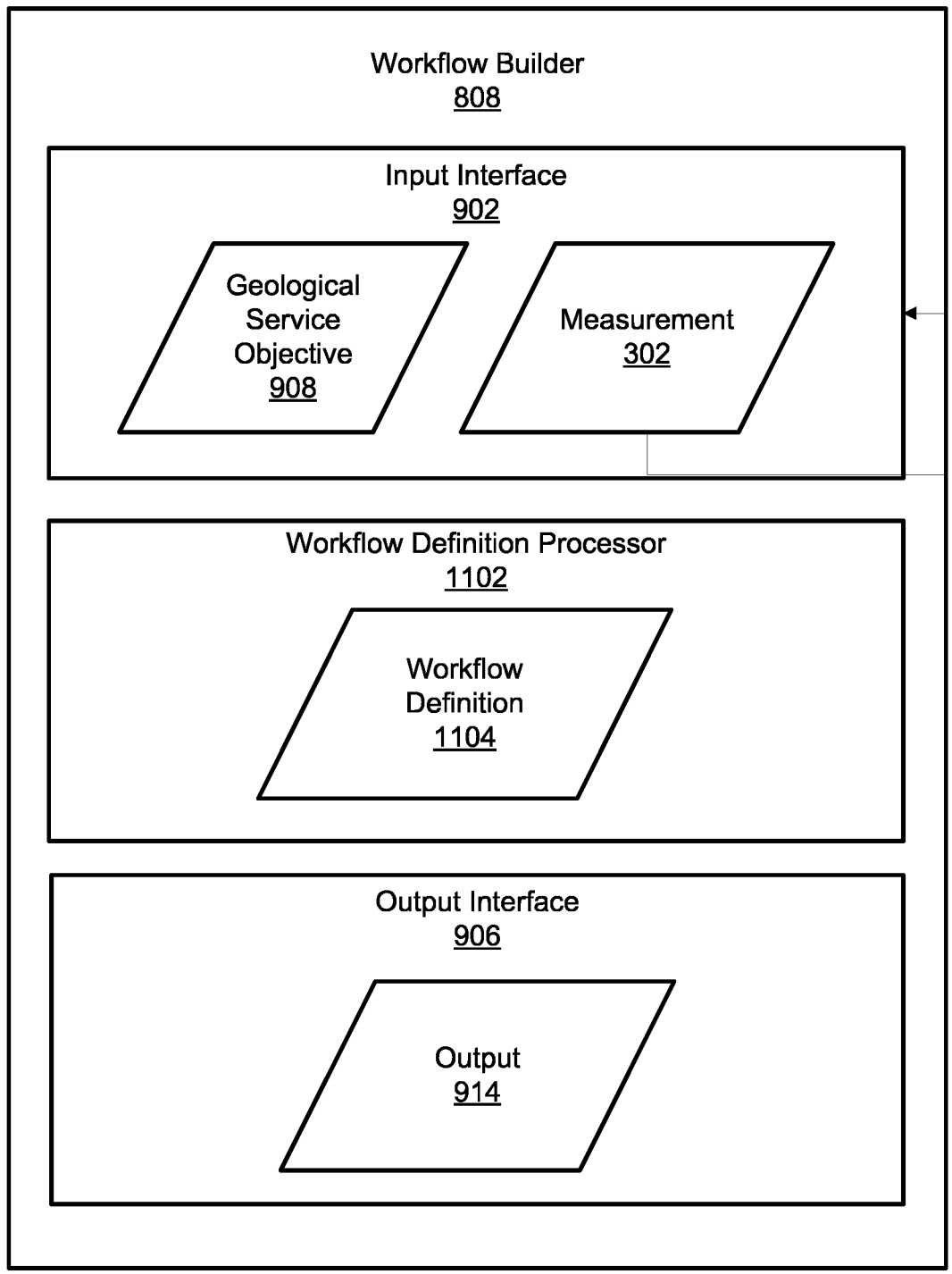
FIG. 11 is a schematic block diagram illustrating an embodiment of an apparatus configured to generate a data analysis process.

FIG. 11 illustrates an embodiment of an apparatus configured to generate a data analysis process. In an embodiment, the apparatus includes the workflow builder 808. In an embodiment, the apparatus includes an input interface 902, a workflow definition processor 1102 and an output interface 906. In an embodiment, an input interface 902 receives a geological service objective 908. Also, the input interface 902 receives a measurement 302 from a data acquisition system 130. In an embodiment, a workflow definition processor 1102 is coupled to the input interface 902. The workflow definition processor 1102 may generate a workflow definition 1104 for analyzing the measurement 302 received from the data acquisition system 130 in response to the geological service objective 908. In an embodiment, the output interface 906 is configured to provide an output 914 including the workflow definition 1104.

Figure 12:
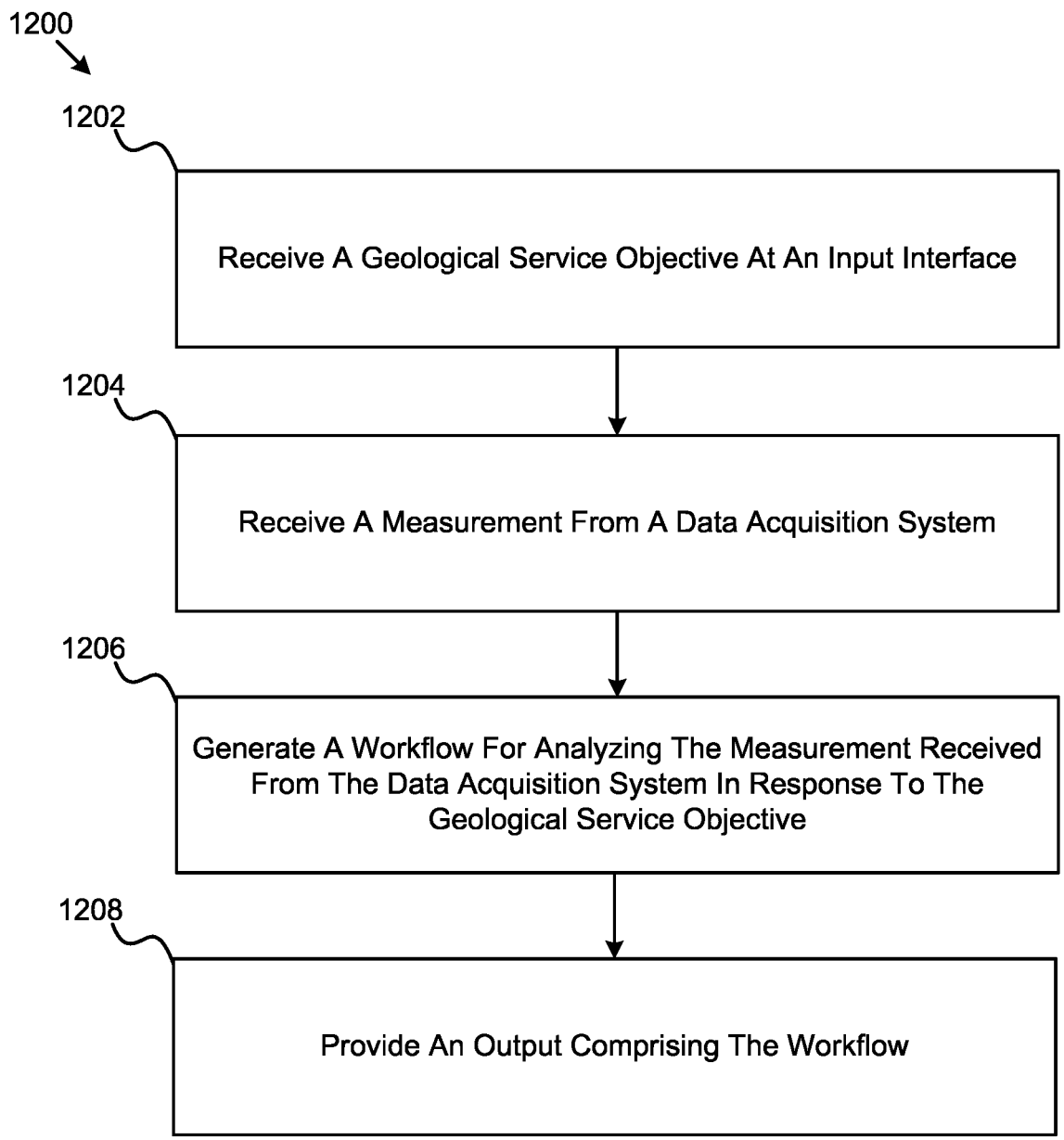
FIG. 12 is a schematic flowchart diagram illustrating an embodiment of a method for defining a data analysis process.

An embodiment of a method 1200 for defining a data analysis process is illustrated in FIG. 12. In an embodiment, the method 1200 includes receiving a geological service objective at an input interface, as shown at 1202, receiving a measurement from a data acquisition system 130, as shown at 1204, generating a workflow for analyzing the measurement received from the data acquisition system 130 in response to the geological service objective, as shown at 1206, and providing an output comprising the workflow, as shown at 1208.

Figure 13:
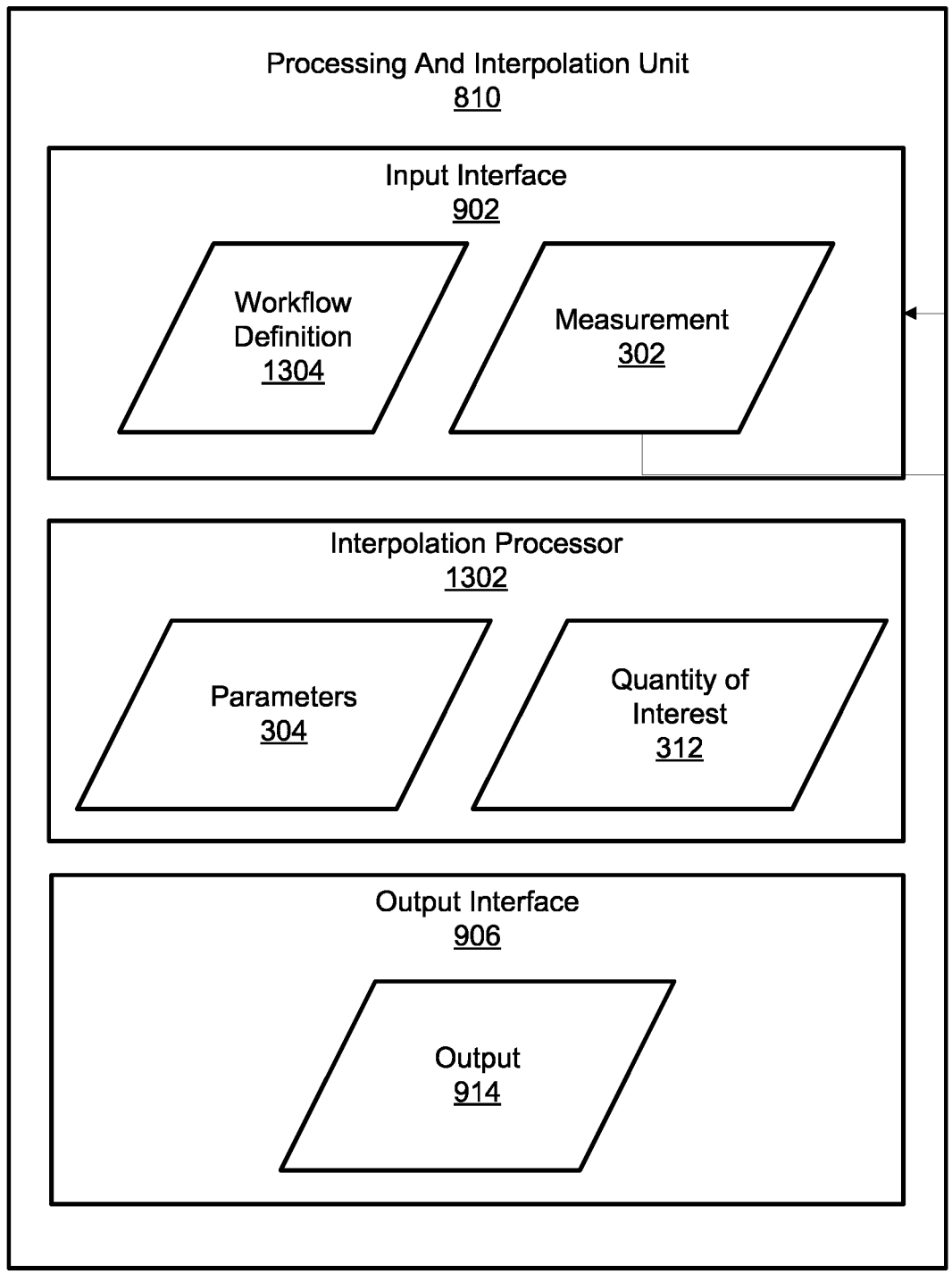
FIG. 13 is a schematic block diagram illustrating an embodiment of an apparatus configured to perform a data analysis process.

FIG. 13 illustrates an embodiment of an apparatus configured to perform a data analysis process. In an embodiment, the apparatus includes the processing and interpolation unit 810. In an embodiment, the apparatus includes an input interface 902 configured to receive a workflow definition 1304 (for example the workflow definition 1104 output by the workflow builder 808) and a measurement from a data acquisition system 130, an interpolation processor 1302 coupled to the input interface 902 and configured to determine a parameter 304 for analyzing the measurement according to the workflow 1304, and analyze the measurement according to the workflow 1304 using the parameter 304 to determine a quantity of interest 312, and an output interface 906 configured to provide an output 914 including the quantity of interest 312.

Figure 14:
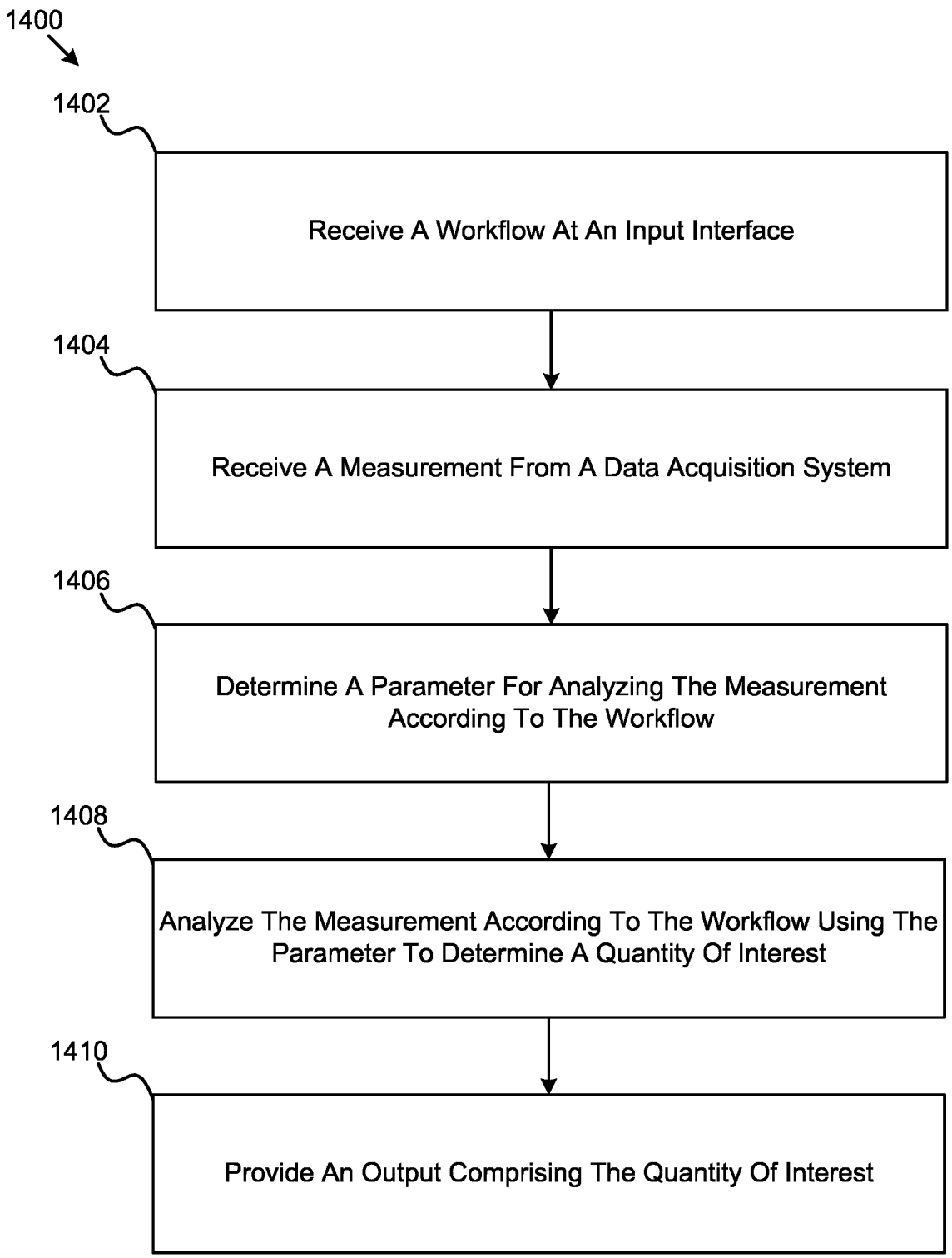
FIG. 14 is a schematic flowchart diagram illustrating an embodiment of a method for processing and interpretation of geological service data.

FIG. 14 illustrates an embodiment of a method 1400 for processing and interpretation of geological service data. In an embodiment, the method 1400 includes receiving a workflow at an input interface, as shown at 1402, receiving a measurement from a data acquisition system 130, as shown at 1404, determining a parameter for analyzing the measurement according to the workflow, as shown at 1406, analyzing the measurement according to the workflow using the parameter to determine a quantity of interest, as shown at 1408, and providing an output including the quantity of interest, as shown at 1410.

Figure 15:
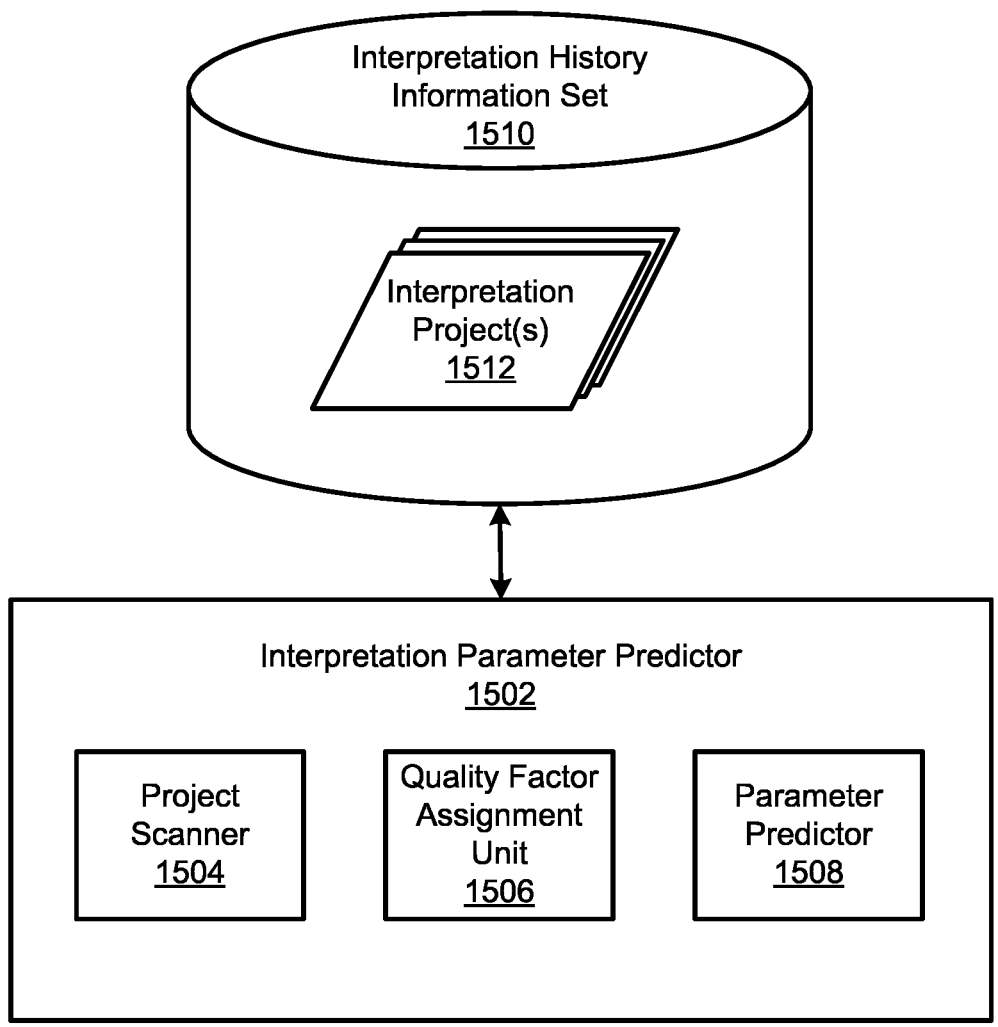
FIG. 15 is a schematic block diagram illustrating an embodiment of a system for interpretation parameter prediction.

FIG. 15 is a schematic block diagram illustrating an embodiment of a system for interpretation parameter prediction. As described above, selection of parameters 304 is an important step for processing and interpretation of acquired data. Previously, experts were required to select an appropriate set of parameters, but there was no way to improve or enhance the parameter selection process. The present embodiments may analyze prior project data in, the training database 814, for example, to determine a set of parameters to be used for a selected workflow 404 or augmented workflow 830. In an embodiment, a system for interpretation parameter prediction may include an interpretation history information set 1510, stored in a data storage device, such as the cloud data storage 106 or data storage 212. In a particular embodiment, the interpretation history information set 1510 may be stored in conjunction with or as part of the training database 814. Information corresponding to one or more prior interpretation projects 1512 may be stored in the interpretation history information set 1510.

In an embodiment, an interpretation parameter predictor 1502, which may be an application or software defined module, a firmware defined module, or a stand-alone hardware device, may include a project scanner 1504, a quality factor assignment unit 1506 and a parameter predictor module 1508.

In an embodiment, the project scanner 1504 may be or include a crawler configured to scan and mine stored project interpretations to extract various interpretation actions that led to the generation of the results. For example, the projects may include wellbore project information. A quality factor may be assigned to each interpretation action/parameter by the quality factor assignment unit 1506, favoring the interpretation actions/parameters that led to the final version of the result. When a new interpretation is to be performed, the parameter predictor 1508 utilizes the geographical, stratigraphical and/or any other relevant meta-information of the interpretation to be done, to compute a predicted parameter value from a weighted average of the recorded interpretation actions, using domain specific weight and a geographical distance weight.

In an embodiment, the automatically proposed interpretation values help incorporate knowledge in previous interpretation projects 1512 and can be used as a guide for new interpretation projects. Beneficially, such a system may reduce interpretation turnaround time, and reduce the risk of errors, and lower the experience-level threshold in the case of less-experienced geoscientists.

In an embodiment, the parameter predictor 1508 may use metadata derived from the interpretation projects 1512 from the project scanner 1504, including, for example, names of interpretation results, user information, stratigraphic information, parameter values, interpretation date/time, geographical information, and the like. The quality factor assignment unit 1506 assigns a quality factor to each historical interpretation entry based on an analysis of the iterative interpretation sequence recorded (with latest interpretation having more value than the initial interpretation iterations), a user driven input to refine existing quality factors, and a utility that proposes a new wellbore interpretation parameter value for each stratigraphic zone based on one or more of: (1) geographical location of the new wellbore, (2) quality weight of each historical interpretation entry, and (3) a domain specific weight. A domain specific weight may be useful for some interpretation parameters where stratigraphical & geographical location is not enough to drive the prediction. For those, the well meta-data can be a differentiator to assess the value of the historical interpretation entries. For example, in a wellbore drilled in an oil-type mud, interpretation parameters to correct for mud invasion may be un-related to a wellbore drilled with a water based mud. In an embodiment, the domain specific weight can be defined manually on a parameter by parameter basis, as well though a statistical analysis to determine which meta-data can be a differentiating factor for some parameter values.

The parameter predictor 1508 predicts interpretation parameters using an algorithm that favors high quality history entries for the same or similar stratigraphic intervals that are geographically close to the new well to be interpreted. A custom weight may give more/less weight to some history entries for specific parameters. The quality of each history entry may increase up to the final version of the interpretation.

The automatically proposed interpretation values help incorporate knowledge in a previous interpretation to be used as a guide for a new interpretation. Exemplary benefits include reducing interpretation turnaround time, and reducing the risk of errors.

Figure 16:
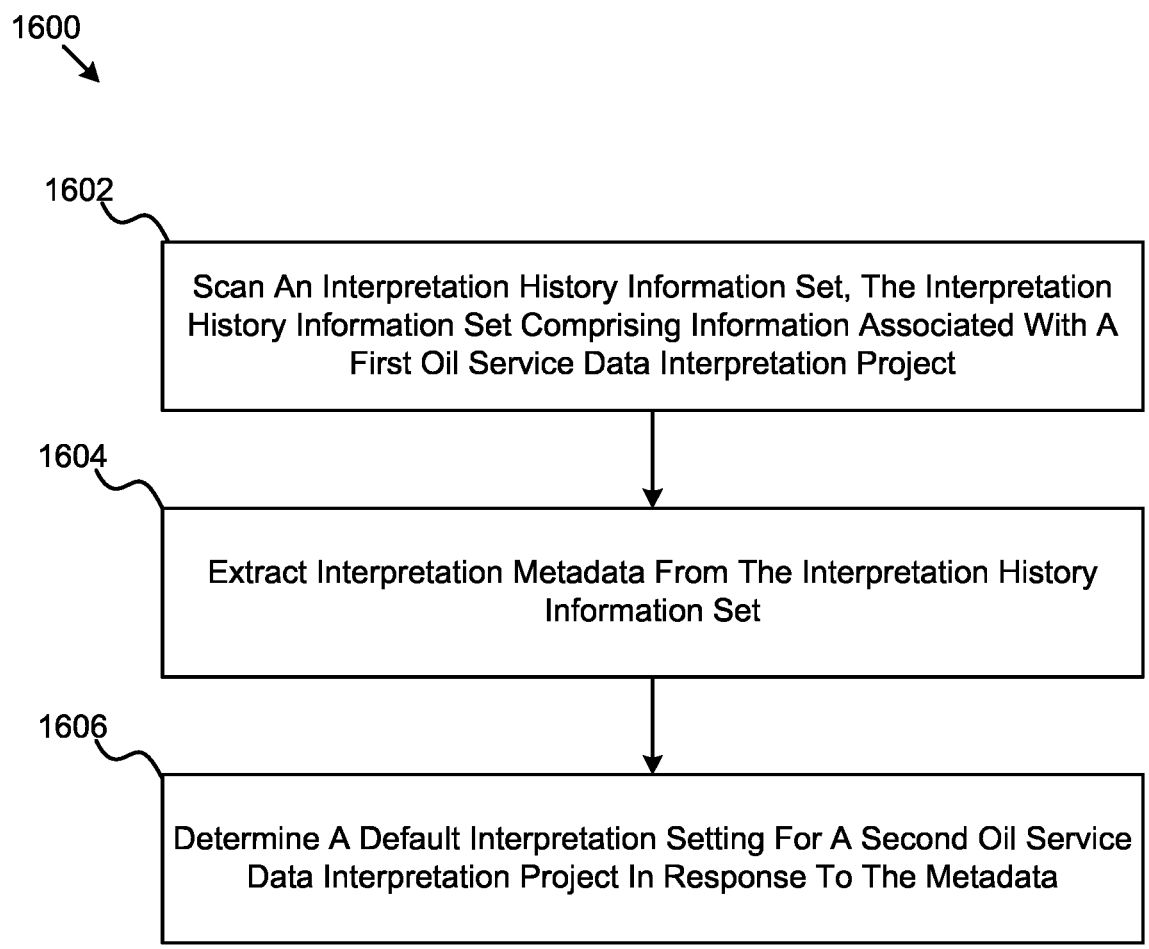
FIG. 16 is a schematic flowchart diagram illustrating an embodiment of a method for interpretation parameter prediction.

FIG. 16 is a schematic flowchart diagram illustrating an embodiment of a method 1600 for interpretation parameter prediction. In an embodiment, the method 1600 may include scanning an interpretation history information set, the interpretation history information set including information associated with a first geological service data interpretation project, as shown at block 1602. The method 1600 may also include extracting interpretation metadata from the interpretation history information set, as shown at block 1604. Additionally, the method 1600 may include determining an interpretation setting for a second geological service data interpretation project in response to the metadata, as shown at block 1606.

Figure 17:
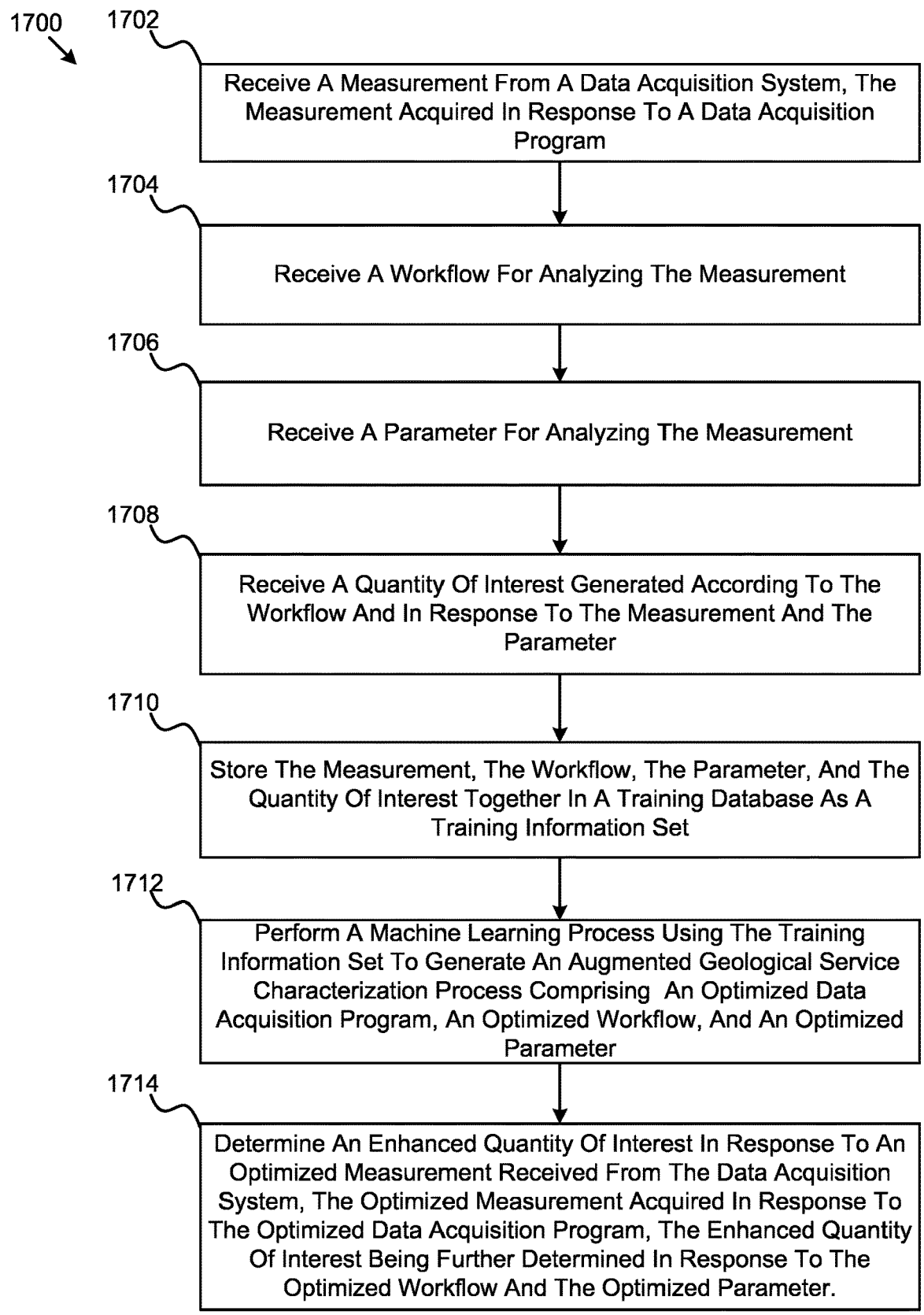
FIG. 17 is a schematic flowchart diagram illustrating an embodiment of a method for augmenting a geological service characterization process.

FIG. 17 illustrates an embodiment of a method 1700 for augmenting a geological service characterization process. In an embodiment, the method 1700 includes receiving a measurement from a data acquisition system 130, the measurement acquired in response to a data acquisition program as shown at block 1702. Also, the method 1700 may include receiving a workflow for analyzing the measurement at block 1704, receiving a parameter for analyzing the measurement at block 1706, and receiving a quantity of interest generated according to the workflow and in response to the measurement and the parameter at block 1708. In an embodiment, the method 1700 may also include storing the measurement, the workflow, the parameter, and the quantity of interest together in a training database as a training information set, as shown at block 1710. The method 1700 may further include performing a machine learning process using the training information set to generate an augmented geological service characterization process including an augmented data acquisition program, an augmented workflow, and an augmented parameter shown at block 1712. Also, the method 1700 may include determining an enhanced quantity of interest in response to an augmented measurement received from the data acquisition system 130, the augmented measurement acquired in response to the augmented data acquisition program, the enhanced quantity of interest being determined in response to the augmented workflow and the augmented parameter as shown at block 1712.

In an embodiment, at least one of the augmented measurement, the augmented data acquisition program, the augmented workflow, the augmented parameter and the enhanced quantity of interest are added to the training information set.

The present embodiments have been described with particular benefit for geological systems and services. The individual aspects and ordered combinations provide a unique and improved solution to incorporating expert knowledge in workflows, in some cases automatically, to preserve and apply that knowledge for the improvement of future workflows and by less experienced operators. While these benefits have been highlighted for geological systems and services, it will be appreciated that additional fields, which may benefit from the present embodiments, include archeology, marine biology, and the like. Although the embodiments described herein may be useful in any of these many geological fields, the present embodiments are described primarily with reference to oil services.

It will also be appreciated that the described methods cannot be performed mentally. For example, the information provided in the information set is not known to a user who has not had those experiences. Further, the information may have disparate domains, units, and formatting and cannot be practically analyzed by a person on any reasonable time scale. Moreover, machine learning techniques are performed, for example, by specially programmed machines.

Although the invention(s) is/are described herein with reference to specific embodiments, various modifications and changes can be made without departing from the scope of the disclosure. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
scanning an interpretation history information set, the interpretation history information set including information associated with a first geological service data interpretation project;
extracting interpretation metadata from the interpretation history information set;
determining a quality factor associated with the interpretation metadata extracted from the interpretation history information set, wherein the quality factor includes a weight value, the weight value being selected from a predetermined range of weight values;

analyzing an iterative interpretation, wherein the weight value associated with a first iteration is lower than a weight value associated with a second iteration, wherein the first iteration occurred before the second iteration;

determining an interpretation setting of a second geological service data interpretation project in response to the metadata; and applying the interpretation setting to an analytics application that operates using data of the second geological service data interpretation project to generate a result.

2. The method of claim 1, further comprising extracting acquired data from the interpretation history information set.

3. The method of claim 2, further comprising extracting a data interpretation workflow from the interpretation history information set, the data interpretation workflow including identification of an operation performed on the acquired data.

4. The method of claim 3, further comprising extracting a parameter used in a data analysis of the operation.

5. The method of claim 4, further comprising extracting a quantity of interest obtained from the acquired data in response to the operation performed and the parameter used in the operation.

6. The method of claim 1, wherein the quality factor is defined by a user input.

7. The method of claim 1, wherein the quality factor is associated with a specific domain.

8. The method of claim 1, wherein the metadata includes at least one value selected from a group of values consisting of an identifier associated with an interpretation result, user information, stratigraphic information, geographic information, a parameter type, a parameter value, a timestamp associated with the interpretation, and a domain-specific value.

* * * * *